United States Patent
Nawata et al.

(10) Patent No.: US 6,913,031 B2
(45) Date of Patent: Jul. 5, 2005

(54) PULSE SHOT TYPE FLOW CONTROLLER AND PULSE SHOT TYPE FLOW CONTROLLING METHOD

(75) Inventors: Tokuhide Nawata, Kasugai (JP); Yoshihisa Sudoh, Kasugai (JP); Masayuki Kouketsu, Kasugai (JP); Masayuki Watanabe, Kasugai (JP); Hiroki Doi, Kasugai (JP)

(73) Assignee: CKD Corporation, Aichi (JP)

( * ) Notice: Subject to any disclaimer, the term of this patent is extended or adjusted under 35 U.S.C. 154(b) by 0 days.

(21) Appl. No.: 10/491,955

(22) PCT Filed: Oct. 16, 2002

(86) PCT No.: PCT/JP02/10733

§ 371 (c)(1),
(2), (4) Date: Apr. 8, 2004

(87) PCT Pub. No.: WO03/034169

PCT Pub. Date: Apr. 24, 2003

(65) Prior Publication Data

US 2004/0244837 A1 Dec. 9, 2004

(30) Foreign Application Priority Data

Oct. 18, 2001 (JP) ......................................... 2001-320560

(51) Int. Cl.⁷ ............................................... G05D 7/06
(52) U.S. Cl. ...................... 137/12; 137/486; 137/487.5; 137/624.15
(58) Field of Search ............................ 137/12, 14, 486, 137/487.5, 624.11, 624.15

(56) References Cited

U.S. PATENT DOCUMENTS

| | | | | |
|---|---|---|---|---|
| 5,394,755 A | * | 3/1995 | Sudo et al. | 73/861 |
| 6,119,710 A | * | 9/2000 | Brown | 137/14 |
| 6,125,869 A | * | 10/2000 | Horiuchi | 137/1 |
| 6,782,906 B2 | * | 8/2004 | Chang | 137/10 |

FOREIGN PATENT DOCUMENTS

| JP | A 8-312900 | 11/1996 |
|---|---|---|
| JP | A 11-202945 | 7/1999 |

* cited by examiner

Primary Examiner—Ramesh Krishnamurth
(74) Attorney, Agent, or Firm—Oliff & Berridge, PLC

(57) ABSTRACT

A flow controller and a flow controlling method are adapted to be released from conventional restrictions by using a novel type called a pulse shot type. A pulse shot (opening/closing operation of a first cutoff valve (12) and, after that, opening/closing operation of a second cutoff valve (17)) is repeated. Simultaneously, a volume flow Q of process gas exhausted from the second cutoff valve (17) per unit time on the basis of after-filling pressure and after-exhaust pressure of the process gas in a gas filling capacity (13) measure by a pressure sensor (14). Furthermore, a mode of the pulse shot is changed to control the volume flow Q of the process gas exhausted from the second cutoff valve (17) per unit time.

18 Claims, 13 Drawing Sheets

FIG. 13

| FILLING | LAPSE TIME (SECOND) | PRESSURE (kPa.abs) | | |
| --- | --- | --- | --- | --- |
| | | N₂ | Ar | |
| t0 | 0.025 | 350.39 | 350.00 | |
| t1 | 0.028 | 350.22 | 349.56 | p1 |
| t2 | 0.029 | 350.13 | 349.41 | p2 |
| t3 | 0.030 | 349.97 | 349.12 | p3 |

| p3−p1 | kPa | −0.254 | −0.435 |
| --- | --- | --- | --- |
| TIME CONSTANT ΔTs | msec | 16 | 13 |
| Ps | kPa.abs | 348.1 | 346.6 |

FIG. 14

| EXHAUST | LAPSE TIME (SECOND) | PRESSURE (kPa.abs) | | |
| --- | --- | --- | --- | --- |
| | | N₂ | Ar | |
| t0' | 0.049 | 288.08 | 281.98 | |
| t1' | 0.050 | 287.17 | 282.01 | p1' |
| t2' | 0.051 | 287.39 | 282.32 | p2' |
| t3' | 0.052 | 287.55 | 282.66 | p3' |

| p3'−p1' | kPa | 0.375 | 0.656 |
| --- | --- | --- | --- |
| TIME CONSTANT ΔTe | msec | 50 | 42 |
| Pe | kPa.abs | 296.8 | 296.1 |

FIG. 15

| FLOW CALCULATION | | N₂ | Ar |
|---|---|---|---|
| TEMPERATURE | °K | 300 | 300 |
| FILLING CAPACITY | cc | 1.75 | 1.75 |
| CYCLE | Hz | 16.67 | 16.67 |
| FLOW | sccm | 807.4 | 794.0 |
| ERROR (SET POINT) | | 0.92 % | −0.75 % |

FIG. 16

| EXHAUST | LAPSE TIME (SECOND) | PRESSURE (kPa.abs) | |
| | | N₂ | Ar |
|---|---|---|---|
| MEASUREMENT UPON FILLING | 0.035 | 349.52 | 348.34 |
| MEASUREMENT UPON EXHAUST | 0.060 | 288.52 | 284.23 |
| PRESSURE DIFFERENCE | kPa | 61.00 | 64.11 |
| TEMPERATURE | °K | 300 | 300 |
| FILLING CAPACITY | cc | 1.75 | 1.75 |
| CYCLE | Hz | 16.66666 | 16.66667 |
| FLOW | sccm | 959 | 1,008 | ns
PULSE SHOT TYPE FLOW CONTROLLER AND PULSE SHOT TYPE FLOW CONTROLLING METHOD

TECHNICAL FIELD

The present invention relates to a pulse shot type flow controller and a pulse shot type flow controlling method for controlling a volume flow of gas.

BACKGROUND TECHNIQUE

Hitherto, in a gas supply system of a semiconductor manufacturing apparatus or the like, to control a flow rate of gas, for example, a thermal-type mass flow controller, a sonic-type flow controller, a Coriolis-type flow controller, an impeller-type flow controller, an ultrasonic-type flow controller, a Karman's vortex type flow controller, or the like is used.

To control the flow rate of gas by using any of them, however, there are many restrictions such as (1) necessity of forceful suppression of a turbulent flow of gas, (2) necessity of providing a measurement device in some midpoint of a channel of the gas, and (3) necessity of regulation of pressure of the gas.

The present invention relates to, therefore, a flow controller and a flow controlling method achieved to solve the problem and its object is to release the flow controller and the flow controlling method from the conventional restrictions by using a novel type called a pulse shot type.

DISCLOSURE OF THE INVENTION

The present invention has an object to provide a flow controller and a flow controlling method adapted to solve the problem and be released from the conventional restrictions by using a novel type called a pulse shot type.

A pulse shot type flow controller according to the invention achieved to solve the problem includes: a first cutoff valve connected to a gas source; a second cutoff valve connected to the first cutoff valve; a gas filling capacity between the first and second cutoff valves; and a pressure sensor for measuring pressure in the gas filling capacity, wherein a pulse shot of performing opening/closing operation of the first cutoff valve and, after that, performing opening/closing operation of the second cutoff valve is repeated, and volume flow of a gas exhausted from the second cutoff valve is calculated on the basis of an after-filling pressure/an after-exhaust pressure of the gas filling capacity measured by the pressure sensor while controlling the volume flow of the gas exhausted from the second cutoff valve by changing the mode of the pulse shot.

In the pulse shot type flow controller according to the present invention, preferably, the volume flow of the gas exhausted from the second cutoff value is calculated by calculating volume of the gas exhausted from the second cutoff valve every the pulse shot and integrating the volumes.

In the pulse shot type flow controller according to the present invention, preferably, the volume flow of the gas exhausted from the second cutoff valve is calculated on the basis of a predetermined cycle of repeatedly making the pulse shot.

In the pulse shot type flow controller according to the present invention, preferably, the mode of the pulse shot is changed by changing the predetermined cycle of repeatedly making the pulse shot.

In the pulse shot type flow controller according to the present invention, preferably, the mode of the pulse shot is changed by changing opening operation duration of the first cutoff valve or the second cutoff valve.

In the pulse shot type flow controller according to the present invention, preferably, the controller further comprises a temperature sensor for measuring temperature of the gas filling capacity, and the volume flow of the gas exhausted from the second cutoff valve is calculated also on the basis of the temperature of the gas filling volume measured by the temperature sensor.

In the pulse shot type flow controller according to the present invention, preferably, an after-filling estimated pressure in a heat equilibrium state after filling is obtained on the basis of a change rate of pressure accompanying an adiabatic change in a period (at the time of filling) since the opening/closing operation of the first cutoff valve is performed until the opening/closing operation of the second cutoff valve is performed, the after-filling estimated pressure is used as the after-filling pressure, an after-exhaust estimated pressure in a heat equilibrium state after exhaust is obtained on the basis of a change rate of pressure accompanying an adiabatic change in a period (at the time of exhaust) since the opening/closing operation of the second cutoff valve is performed until the opening/closing operation of the first cutoff valve is performed, and the after-exhaust estimated pressure is used as the after-exhaust pressure.

In the pulse shot type flow controller according to the present invention, preferably, the first cutoff valve is closed when the pressure of the gas filling capacity measured by the pressure sensor becomes a predetermined value or larger.

In the pulse shot type flow controller according to the present invention, preferably, the controller is used for a semiconductor manufacturing apparatus.

Alternatively, a pulse shot type flow controlling method made to solve the above problems is characterized by comprising: a first cutoff valve connected to a gas source; a second cutoff valve connected to the first cutoff valve; a gas filling capacity between the first and second cutoff valves; and a pressure sensor for measuring pressure in the gas filling capacity, wherein a pulse shot of performing opening/closing operation of the first cutoff valve and, after that, performing opening/closing operation of the second cutoff valve is repeated, and volume flow of a gas exhausted from the second cutoff valve is calculated on the basis of an after-filling pressure/an after-exhaust pressure of the gas filling capacity measured by the pressure sensor, while controlling the volume flow of the gas exhausted from the second cutoff valve by changing the mode of the pulse shot.

In the pulse shot type flow controlling method according the present invention, preferably, the volume flow of the gas exhausted from the second cutoff value is calculated by calculating volume of the gas exhausted from the second cutoff valve every the pulse shot and integrating the volumes.

In the pulse shot type flow controlling method according to the present invention, preferably, the volume flow of the gas exhausted from the second cutoff valve is calculated on the basis of a predetermined cycle of repeatedly making the pulse shot.

In the pulse shot type flow controlling method according to the present invention, preferably, the mode of the pulse shot is changed by changing the predetermined cycle of repeatedly making the pulse shot.

In the pulse shot type flow controlling method according to the present invention, preferably, the mode of the pulse shot is changed by changing opening operation duration of the first cutoff valve or the second cutoff valve.

In the pulse shot type flow controlling method according to the present invention, preferably, the method further comprises a temperature sensor for measuring temperature of the gas filling capacity, and the volume flow of the gas exhausted from the second cutoff valve is calculated also on the basis of the temperature of the gas filling volume measured by the temperature sensor.

In the pulse shot type flow controlling method according to the present invention, preferably, an after-filling estimated pressure in a heat equilibrium state after filling is obtained on the basis of a change rate of pressure accompanying an adiabatic change in a period (at the time of filling) since the opening/closing operation of the first cutoff valve is performed until the opening/closing operation of the second cutoff valve is performed, the after-filling estimated pressure is used as the after-filling pressure, an after-exhaust estimated pressure in a heat equilibrium state after exhaust is obtained on the basis of a change rate of pressure accompanying an adiabatic change in a period (at the time of exhaust) since the opening/closing operation of the second cutoff valve is performed until the opening/closing operation of the first cutoff valve is performed, and the after-exhaust estimated pressure is used as the after-exhaust pressure.

In the pulse shot type flow controlling method according to the present invention, preferably, the first cutoff valve is closed when the pressure of the gas filling capacity measured by the pressure sensor becomes a predetermined value or larger.

In the pulse shot type flow controlling method according to the present invention, preferably, the method is used for a semiconductor manufacturing apparatus.

The pulse shot type flow controller and the pulse shot type flow controlling method of the invention having such characteristics controls the volume flow of gas by using a novel type called a pulse shot type described hereinbelow.

When first and second cutoff valves are in a closed state, a pulse shot of performing opening/closing operation of the first cutoff valve and, after that, performing opening/closing operation of the second cutoff valve is made once. The pressure in gas filling capacity between the first and second cutoff valves increases by the opening operation of the first cutoff valve and decreases by the opening operation of the second cutoff valve. Therefore, when a pressure after filling the gas filling capacity is $Pi_{fill}$, a pressure after exhausting the gas filling capacity is $Pi_{redu}$, and the volume of the gas exhausted from the second cutoff valve is Qi in an i-th pulse shot, the volume Qi of the process gas exhausted from the second cutoff valve by the pulse shot of the i-th time is obtained by conversion in atmospheric pressure by the following equation (1).

$$Qi = V(Pi_{fill} - Pi_{redu})/1.0332 * \alpha \qquad \text{Equation (1)}$$

where "V" denotes the capacity of the gas filling capacity and "α" indicates a correction factor (a correction term for a variation which is caused by flow characteristics of the first and second cutoff valves).

In the pulse shot type flow controller and the pulse shot type flow controlling method of the invention, since the pulse shot is repeated, for example, the volume flow Q(i, j) of gas exhausted from the second cutoff valve by the i-th to j-th pulse shots is obtained by the following equation (2).

$$Q(i,j) = Qi + Qi+1 + \ldots + Qj-1 + Qj \qquad \text{Equation (2)}$$

In the case where the pulse shot repeats in predetermined cycles F, when an inverse number of the predetermined cycle F is set as r (times/second), for example, a volume flow Q(i+1, i+r) of the process gas exhausted from the second cutoff valve for one second from the (i+1)th pulse shot can be obtained by the following equation (3).

$$Q(i+1, i+r) = Qi+1 + Qi+2 + \ldots + Qi+r-1 + Qi+r \qquad \text{Equation (3)}$$

When volumes Qi+1, Qi+2, ..., Qi+r−1, and Qi+r of the gas exhausted from the second cutoff valve by the pulse shots are equal to each other, for example, the following equation (4) is obtained by simplifying the equation (3).

$$Q(i+1, i+r) = r \times Qi+1 \qquad \text{Equation (4)}$$

Further, by applying the idea of the equation (4), the volume flow Q(S) of the gas exhausted from the second cutoff valve of S seconds from the (i+1)th pulse shot can be obtained by the following equation (5).

$$Q(S) = S \times Q(i+1, i+r) \qquad \text{Equation (5)}$$

In the equation (5), Q(i+1, i+r) in the equation (3) or Q(i+1, i+r) in the equation (4) may be used.

According to the equations (1) to (5), by changing the mode of the pulse shot, the volume flow Q of gas exhausted from the second cutoff valve can be controlled.

This point will be concretely described. For example, in the case where the pulse shot is repeated in predetermined cycles F, when the predetermined cycle F of repeating the pulse shot is changed, the inverse number r (times/second) of the predetermined cycle F also changes. Consequently, the volume flow Q(i+1, i+r) of the gas exhausted from the second cutoff valve for one second immediately after the i-th pulse shot can be controlled. Moreover, the volume flow Q of the gas exhausted from the second cutoff valve can be controlled.

According to the equation (1), the volume Qi of the gas exhausted from the second cutoff valve by the i-th pulse shot is influenced by the pressure $Pi_{fill}$ after filling of the gas filling capacity and the pressure $Pi_{redu}$ after exhaust of the gas filling capacity. With respect to the point, there is a case that the pressure $Pi_{fill}$ after filling of the gas filling capacity can be changed by changing opening operation duration of the first cutoff valve. There is a case that the pressure $Pi_{redu}$ after exhaust of the gas filling capacity can be changed by changing opening operation duration of the second cutoff valve. Consequently, by changing the opening operation duration of the first cutoff valve or the opening operation duration of the second cutoff valve, the volume Qi of the gas exhausted from the second cutoff valve by the i-th pulse shot can be controlled and, moreover, the volume flow Q of the gas exhausted from the second cutoff valve can be controlled.

When the temperature of the gas is considered in the equation (1), the volume Qi of the gas exhausted from the second cutoff valve by the i-th pulse shot by 20° C. conversion is the value obtained by the following equation (6).

$$Qi(T=20) = Qi \times 293/(Ti+273) \qquad \text{Equation (6)}$$

where "Ti" denotes the temperature (° C.) of the gas filling capacity in the i-th pulse shot. "Qi (T=20)" is a value obtained by performing 20° C. conversion on the volume Qi of the gas exhausted from the second cutoff valve by the i-th pulse shot.

In the pulse shot type flow controller and the pulse shot type flow controlling method of the invention, the novel type called the pulse shot type is used, that is, the pulse shot of performing the opening/closing operation of the first cutoff valve and, after that, performing the opening/closing operation of the second cutoff valve is repeated, the volume flow of the gas exhausted from the second cutoff valve is calculated on the basis of the after-filling pressure and after-exhaust pressure of the gas filling capacity measured by the pressure sensor and, further, the mode of the pulse shot is changed, thereby controlling the volume flow of the gas exhausted from the second cutoff valve. Therefore, (1) there is no influence of a turbulent flow of the gas and a device such as a laminar flow tube for forcefully suppressing turbulent flow of the gas becomes unnecessary. (2) It becomes unnecessary to interpose a measurement device such as a tubule in a channel of the gas. (3) The pressure of the gas is not regulated, a device such as a regulator becomes unnecessary, and the components become simpler. In such a manner, the pulse shot type flow controller can be released from the conventional restrictions.

In a semiconductor manufacturing apparatus, corrosive gas is used, gas replacement is performed, and a cutoff valve is often used for switching a gas channel or the like. By using the pulse shot type flow controller and the pulse shot type flow controlling method for a semiconductor manufacturing apparatus, (4) since a measurement device such as a tubule is not used, abnormality such as clogging caused by corrosion does not occur. (5) Since there is no dead volume, gas replacement can be executed with reliability. (6) By using the first and second cutoff valves for switching a gas channel, the number of cutoff valves used for switching a gas channel or the like can be reduced.

BRIEF DESCRIPTION OF THE DRAWINGS

FIG. 13 is a diagram showing values of various data calculated at the time of filling when volume flow Q is calculated in consideration of a temperature change accompanying an adiabatic change in the case of performing pulse shots at high frequency in the pulse shot type flow controller of the invention;

FIG. 14 is a diagram showing values of various data calculated at the time of exhaust when the volume flow Q is calculated in consideration of a temperature change accompanying an adiabatic change in the case of performing pulse shots at high frequency in the pulse shot type flow controller of the invention;

FIG. 15 is a diagram showing various data and calculation values which are necessary at the time of calculating the volume flow Q in consideration of a temperature change accompanying an adiabatic change in the case of performing pulse shots at high frequency in the pulse shot type flow controller of the invention; and FIG. 16 is a diagram showing various data and calculation values which are necessary at the time of calculating the volume flow Q without considering a temperature change accompanying an adiabatic change in the case of performing pulse shots at high frequency in the pulse shot type flow controller of the invention.

BEST MODE FOR CARRYING OUT THE INVENTION

Figure 1:
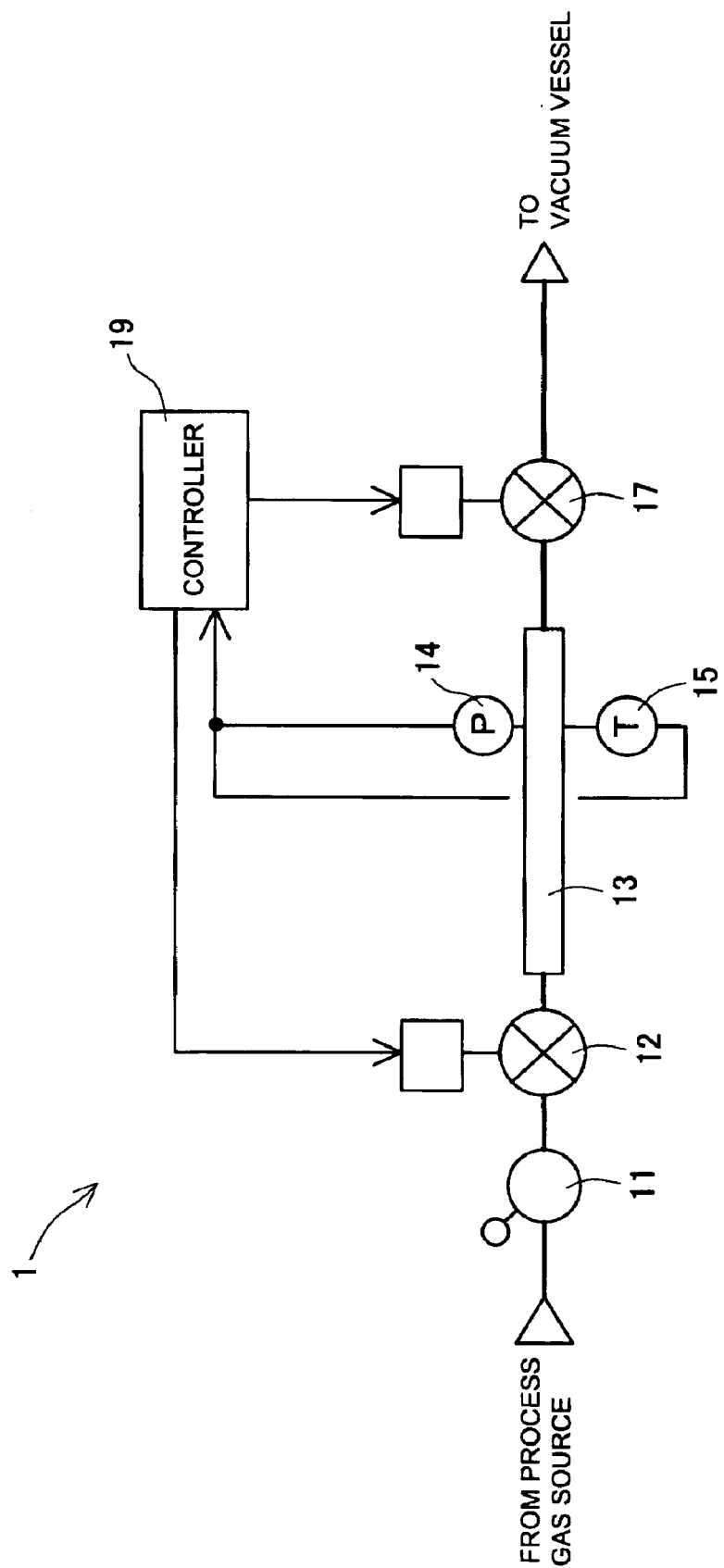
FIG. 1 is a diagram showing a general outline of a pulse shot type flow controller of the invention.

Embodiments of the invention will be described hereinbelow with reference to the drawings. FIG. 1 shows a general outline of a pulse shot type flow controller 1. The pulse shot type flow controller 1 is constructed of a manual valve 11, a first cutoff valve 12, a gas filling capacity 13, a pressure sensor 14, a temperature sensor 15, a second cutoff valve 17, a controller 19, and the like. The first cutoff valve 12, pressure sensor 14, temperature sensor 15, and second cutoff valve 17 are connected to the controller 19. Therefore, each of the opening/closing operation of the first cutoff valve 12 and the opening/closing operation of the second cutoff valve 17 can be controlled by the controller 19. The pressure sensor 14 is provided for the gas filling capacity 13 to convert pressure in the gas filling capacity 13 to an electric signal. Further, the temperature sensor 15 is provided for the gas filling capacity 13 to convert the temperature in the gas filling capacity 13 to an electric signal. Therefore, the controller 19 can detect the pressure and temperature in the gas filling capacity 13 via the pressure sensor 14 and the temperature sensor 15.

Figure 4:
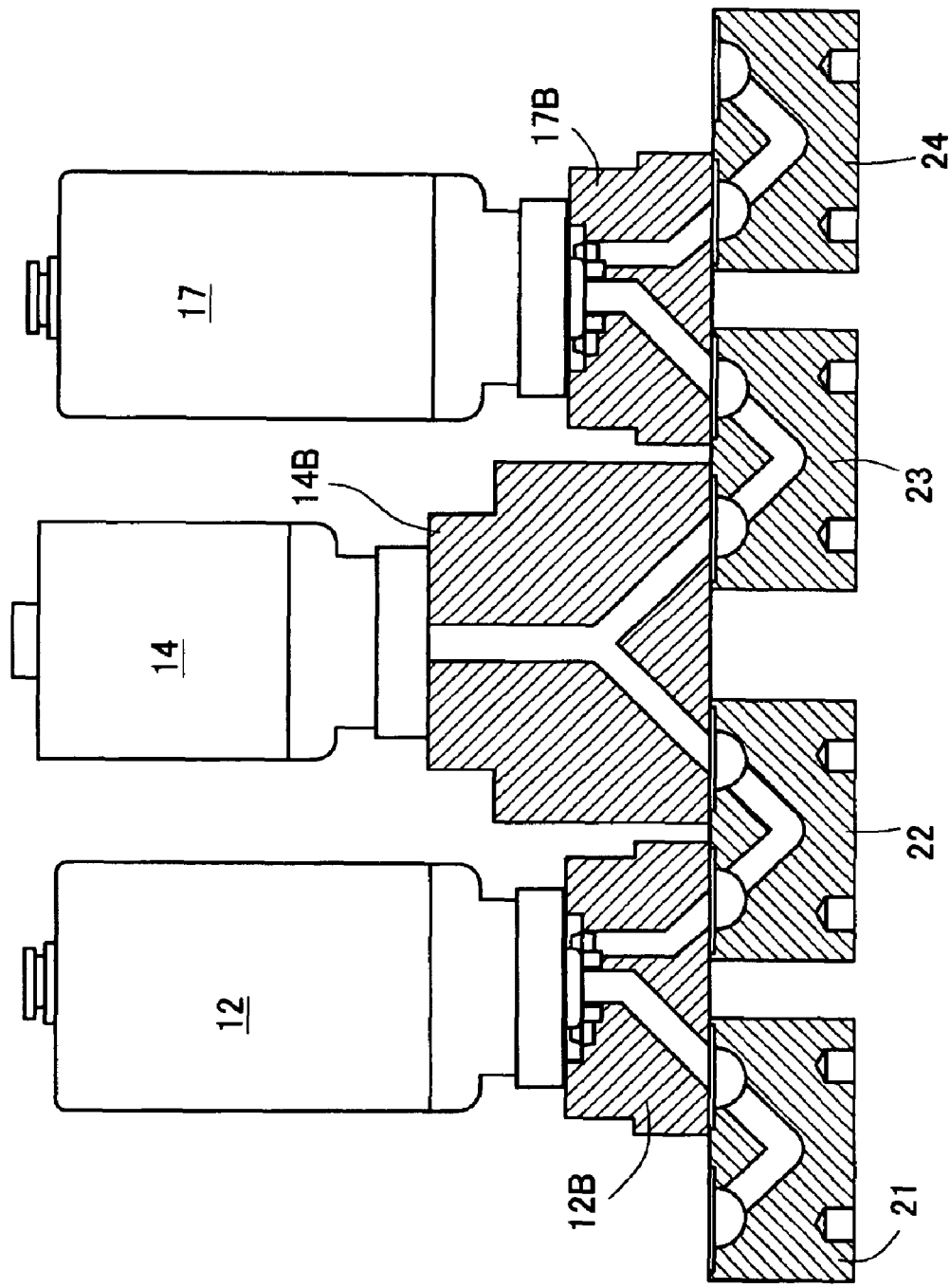
FIG. 4 is a diagram showing a configuration example of the gas filling capacity in the pulse shot type flow controller of the invention.

The gas filling capacity 13 refers to a hermetically closed space formed between the first and second cutoff valves 12 and 17 when both of the first and second cutoff valves 12 and 17 are in a closed state. Concretely, for example, as shown in FIG. 4, in the case of constructing the space between the first and second cutoff valves 12 and 17 by block devices such as the first cutoff valve 12, pressure sensor 14, and second cutoff valve 17 and channel blocks 21, 22, 23, and 24, an outlet-side channel in a base block 12B of the first cutoff valve 12, a channel in the channel block 22, a channel in a base block 14B of the pressure sensor 14, a channel in the channel block 23, an inlet-side channel in a base block 17B of the second cutoff valve 17, and the like correspond to the gas filling capacity 13.

In FIG. 1 (and FIG. 7 to be described later), in order to emphasize the existence of the gas filling capacity 13, the gas filling capacity 13 is expressed a little different from the above-described definition.

As shown in FIG. 1, the pulse shot type flow controller 1 is assembled in a semiconductor manufacturing apparatus. An upstream side of the manual valve 11 is connected to a pressed process gas source. A downstream side of the second cutoff valve 17 is connected to an evacuated vacuum vessel.

The pulse shot type flow controller 1 in FIG. 1 supplies, for example, process gas of 0.1 to 100 L/min by repeating a pulse shot (opening/closing operation of the first cutoff valve 18 and, after that, opening/closing operation of the second cutoff valve 17) by the controller 19, that is, by a novel type called the pulse shot type.

In the pulse shot type flow controller 1 of FIG. 1, the controller 19 calculates the volume flow Q of process gas exhausted from the second cutoff valve 17 on the basis of an after-filling pressure $P_{fill}$ and an after-exhaust pressure $P_{redu}$ of the process gas in the gas filling capacity 13 measured by the pressure sensor 14 and on the basis of temperature T of the process gas in the gas filling capacity 13 measured by the temperature sensor 15.

Concretely, by performing a pulse shot (opening/closing operation of the first cutoff valve 12 and, after that, opening/closing operation of the second cutoff valve 17) once when the first and second cutoff valves 12 and 17 are in a closed state, the pressure of the process gas in the gas filling capacity 13 between the first and second cutoff valves 12 and 17 increases by the opening operation of the first cutoff valve 12 and decreases by the opening operation of the second cutoff valve 17.

Figure 2:
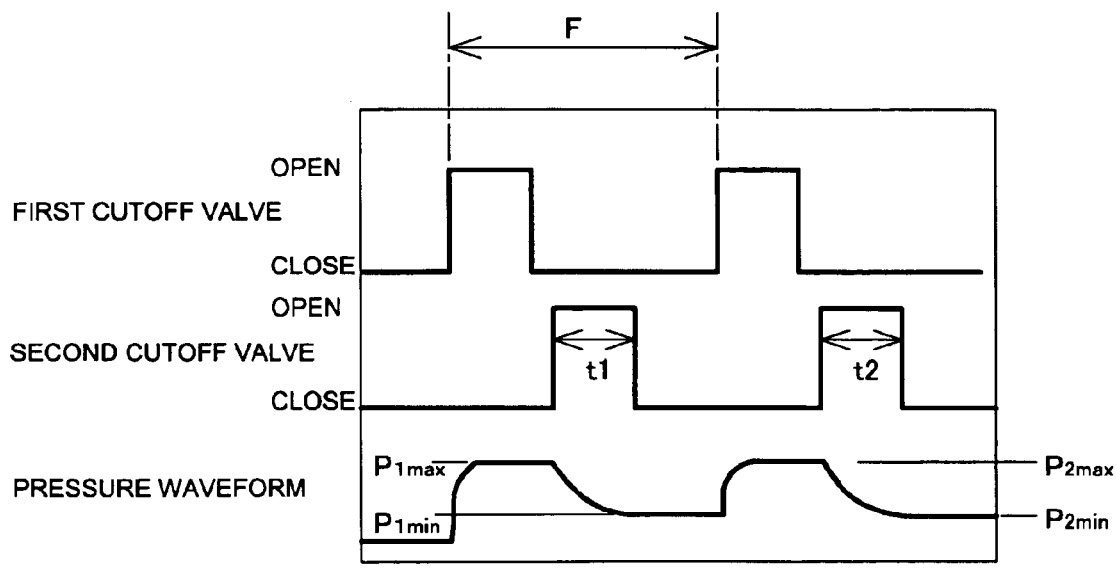
FIG. 2 is a diagram showing an example of the relation between opening/closing operations of first and second cutoff valves under certain conditions in pulse shots of the pulse shot type flow controller of the invention and pressure waveform of process gas in gas filling capacity.

Therefore, for example, as shown in FIG. 2, in the pulse shot of the first time, when a pressure after filling the process gas in the gas filling capacity 13 is $P1_{fill}$, a pressure after exhausting the process gas of the gas filling capacity 13 is $P1_{redu}$, and volume of the process gas exhausted from the second cutoff valve 17 is Q1, the pulse shot type flow controller 1 of FIG. 1 calculates the volume Q1 of the process gas exhausted from the second cutoff valve 17 by the pulse shot of the first time by conversion in atmospheric pressure by the following equation (1)'.

$$Q1=V(P1_{fill}-P1_{redu})/1.0332*\alpha \qquad \text{Equation (1)'}$$

where "V" denotes the capacity of the gas filling capacity 13 and "α" indicates a correction factor (a correction term for a variation which is caused by flow characteristics of the first and second cutoff valves 12 and 17).

Further, the pulse shot type flow controller 1 of FIG. 1 converts the volume Q1 of the process gas exhausted from the second cutoff valve 17 by the pulse shot of the first time by 20° C. conversion in consideration of the temperature T of the process gas in the gas filling capacity 13 in the equation (1)' by the following equation (6)'.

$$Q1(T=20)=Q1\times293/(T1+273) \qquad \text{Equation (6)'}$$

where "T1" denotes the temperature (° C.) of the process gas in the gas filling capacity 13 in the pulse shot of the first time. "Q1(T=20)" is a value obtained by performing 20° C. conversion on the volume Q1 of the process gas exhausted from the second cutoff valve 17 by the pulse shot of the first time.

As shown in FIG. 2, in a pulse shot of the second time, when a pressure after filling the process gas in the gas filling capacity 13 is $P2_{fill}$, a pressure after exhausting the process gas in the gas filling capacity 13 is $P2_{redu}$, and the volume of the process gas exhausted from the second cutoff valve 17 is Q2, in a manner similar to the equation (1)', the pulse shot type flow controller 1 of FIG. 1 calculates the volume Q2 of the process gas exhausted from the second cutoff valve 17 by the pulse shot of the second time by conversion in atmospheric pressure by the following equation (1)".

$$Q2=V(P2_{fill}-P2_{redu})/1.0332*\alpha \qquad \text{Equation (1)"}$$

Further, in the pulse shot type flow controller 1 of FIG. 1, also in the equation (1)", the volume Q2 of the process gas exhausted from the second cutoff valve 17 by the pulse shot of the second time is obtained by 20° C. conversion in consideration of the temperature T of the process gas in the gas filling capacity 13 by the following equation (6)".

$$Q2(T=20)=Q2\times293/(T2+273) \qquad \text{Equation (6)"}$$

where "T2" denotes the temperature (° C.) of the process gas in the gas filling capacity 13 in the pulse shot of the second time. "Q2(T=20)" is a value obtained by performing 20° C. conversion on the volume Q2 of the process gas exhausted from the second cutoff valve 17 by the pulse shot of the second time.

Since the pulse shot type flow controller 1 of FIG. 1 repeats the pulse shot (the opening/closing operation of the first cutoff valve 12 and, after that, the opening/closing operation of the second cutoff valve 17), for example, the volume flow Q(i, j) of the process gas exhausted from the second cutoff valve 17 by the i-th to j-th pulse shots is obtained by 20° C. conversion by the following equation (2)'.

$$Q(i,j)(T=20)=Qi(T=20)+\ldots+Qj-1(T=20)+Qj(T=20) \quad \text{Equation (2)'}$$

where "Q(i,j)(T=20)" is a value obtained by performing 20° C. conversion on the volume flow Q(i,j) of the process gas exhausted from the second cutoff valve 17 by the i-th to j-th pulse shots.

Therefore, the pulse shot type flow controller 1 of FIG. 1 can obtain the volume flow Q of the process gas exhausted from the second cutoff valve 17, for example, per unit time by using the equation (2)' at any of the present and past time points by 20° C. conversion.

In the pulse shot type flow controller 1 of FIG. 1, as shown in FIG. 2, in the case where the pulse shot repeats in predetermined cycles F (for example, 0.1 second), when an inverse number of the predetermined cycle F is set as r (times/second), for example, a volume flow Q(i+1, i+r) of the process gas exhausted from the second cutoff valve 17 for one second from the (i+1)th pulse shot can be obtained by the following equation by 20° C. conversion.

$$Q(i+1, i+r)(T=20)=Qi+1(T=20)+\ldots+Qi+r(T=20) \quad \text{Equation (3)'}$$

where "Q(i+1, i+r)(T32 20)" is a value obtained by 20° C. conversion performed on the volume flow Q(i+1, i+r) of the process gas exhausted from the second cutoff valve 17 per second from the (i+1)th pulse shot in the case where the pulse shot is repeated in the predetermined cycles F (that is, r (times/second)).

In FIG. 1, for example, in the case where the pressure condition of a process gas source on the upstream side of the pulse shot type flow controller 1 and the pressure condition of a vacuum vessel on the downstream side are stable, the values of volumes Qi+1(T=20), . . . , and Qi+r(T=20) of the process gas exhausted from the second cutoff valve 17 by the (i+1)th to the (i+r)th pulse shots are equal to each other.

In the pulse shot type flow controller 1 of FIG. 1, therefore, in the case where the pressure condition of the process gas source on the upstream side of the pulse shot type flow controller 1 and the pressure condition of the vacuum vessel on the downstream side of the pulse shot type flow controller 1 are stable, the following equation (4)' obtained by simplifying the equation (3)' is used.

$$Q(i+1, i+r)(T=20) = r \times Qi+1(T=20) \qquad \text{Equation (4)'}$$

Therefore, in the pulse shot type flow controller 1 of FIG. 1, by using the equation (4)', the volume flow Q(i+1, i+r) of the process gas exhausted from the second cutoff valve 17 per second from the (i+1)th pulse shot can be obtained by 20° C. conversion using any one of the volumes Qi+1(T=20), . . . , and Qi+r(T=20) of the process gas exhausted from the second cutoff valve 17 by the (i+1)th to (i+r)th pulse shots.

Further, the pulse shot type flow controller 1 of FIG. 1 obtains the volume flow Q(S) of the process gas exhausted from the second cutoff valve 17 of S seconds from the (i+1)th pulse shot by 20° C. conversion by the following equation (5)' which is an application of the equation (4)'.

$$Q(S)(T=20) = S \times Q(i+1, i+r)(T=20) \qquad \text{Equation (5)'}$$

where "Q(S)(T=20)" denotes the value obtained by the volume flow Q(S) of the process gas exhausted from the second cutoff valve 17 for S seconds from the (i+1)th pulse shot by 20° C. conversion in the case where the pulse shot is repeated in predetermined cycles F (that is, r(times/second)).

In the equation (5)', (Qi+1, i+r)(T=20) in the equation (3)' or (4)' may be used.

Therefore, by using the equation (5)', the pulse shot type flow controller 1 of FIG. 1 can obtain the volume flow Q(S) of the process gas exhausted from the second cutoff valve 17 for S seconds from the (i+1)th pulse shot by 20° C. conversion using the sum of volumes Qi+1, . . . , and Qi+r of the process gas exhausted from the second cutoff valve 17 by the (i+1)th to (i+r)th pulse shots, or by 20° C. conversion using any one of the volumes Qi+1, . . . , and Qi+r of the process gas exhausted from the second cutoff valve 17 by the (i+1)th to (i+r)th pulse shots.

The pulse shot type flow controller 1 of FIG. 1 controls the volume flow of the process gas exhausted from the second cutoff valve 17 by changing the mode of the pulse shot (opening/closing operation of the first cutoff valve 12 and, after that, opening/closing operation of the second cutoff valve 17) on the basis of the equations (1)' to (5)'.

This point will be concretely described. For example, in the case where the pulse shot is repeated in predetermined cycles F as shown in FIG. 2, when the predetermined cycle F of repeating the pulse shot is changed, the inverse number r (times/second) of the predetermined cycle F also changes. Consequently, the pulse shot type flow controller 1 of FIG. 1 can control the volume flow Q(i+1, i+r)(T=20) of the process gas exhausted from the second cutoff valve 17 for one second from the (i+1)th pulse shot by the equations (3)', (4)', and (5)'.

Therefore, in the pulse shot type flow controller 1 of FIG. 1, by changing the predetermined cycle F of repeating the pulse shot (the opening/closing operation of the first cutoff valve 12 and, after that, the opening/closing operation of the second cutoff valve 17), for example, the volume flow Q(i+1, i+r)(T=20) of the process gas exhausted from the second cutoff valve 17 for one second from the (i+1)th pulse shot can be controlled and, moreover, the volume flow Q of the process gas exhausted from the second cutoff valve 17 can be controlled.

According to the equation (1)', the volume Q1 of the process gas exhausted from the second cutoff valve 17 by the pulse shot of the first time is influenced by the pressure P1$_{fill}$ after filling of the process gas in the gas filling capacity 13 and the pressure P1$_{redu}$ after exhaust of the process gas of the gas filling capacity 13.

In the pulse shot type flow controller 1 of FIG. 1, for example, in FIG. 2, by changing opening operation duration t1 of the second cutoff valve 17, the after-exhaust pressure P1$_{redu}$ of the process gas in the gas filling capacity 13 can be changed. Consequently, by changing the opening operation duration t1 of the second cutoff valve 17, the volume Q1 of the process gas exhausted from the second cutoff valve 17 by the pulse shot of the first time can be controlled. Similarly, by changing opening operation duration t2 of the second cutoff valve 17, after-exhaust pressure P2$_{redu}$ of the process gas of the gas filling capacity 13 can be changed. Consequently, by changing the opening operation duration t2 of the second cutoff valve 17, volume Q2 of the process gas exhausted from the second cutoff valve 17 by the pulse shot of the second time can be controlled.

Therefore, in the pulse shot type flow controller 1 of FIG. 1, by changing the opening operation durations t1, t2, . . . of the second cutoff valve 17 for performing the pulse shot (the opening/closing operation of the first cutoff valve 12 and, after that, the opening/closing operation of the second cutoff valve 17), for example, the volumes Q1, Q2, . . . of the process gas exhausted from the second cutoff valve 17 by the pulse shots can be controlled and, moreover, the volume flow Q of the process gas exhausted from the second cutoff valve 17 can be controlled.

Figure 3:
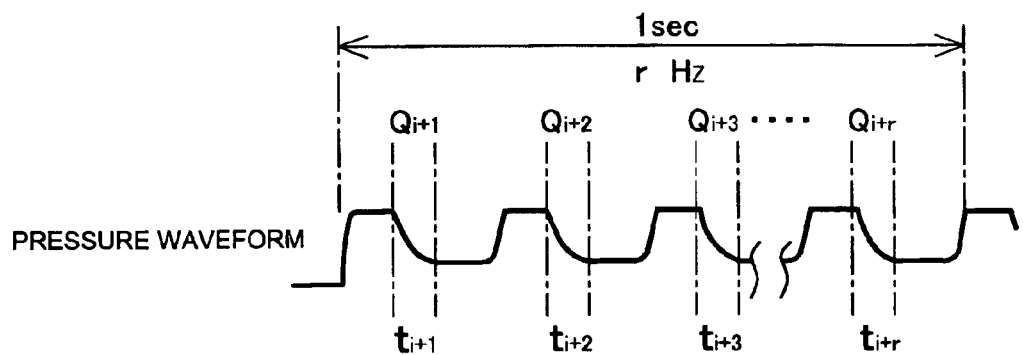
FIG. 3 is a diagram showing an example of pressure waveform of process gas in the gas filling capacity of one second under certain conditions in the pulse shot type flow controller of the invention.

In the pulse shot type flow controller 1 of FIG. 1, in the case where the pulse shot is repeated in the predetermined cycle F and the inverse number of the predetermined cycle F is r (times/second) as shown in FIGS. 2 and 3, similarly, by changing opening operation durations ti+1, ti+2, ti+3, . . . , and ti+r of the second cutoff valve 17 of the (i+1)th to (i+r)th pulse shots, after-exhaust pressures Pi+1$_{redu}$, Pi+2$_{redu}$, Pi+3$_{redu}$, . . . , and Pi+r$_{redu}$ (not shown) of the process gas in the gas filling capacity 13 of the (i+1)th to (i+r)th pulse shots can be changed. Thus, volumes Qi+1(T=20), Qi+2(T=20), Qi+3(T=20), . . . , and Qi+r(T=20) of the process gas exhausted from the second cutoff valve 17 by the (i+1)th to (i+r)th pulse shots can be controlled and, moreover, the volume flow Q of the process gas exhausted from the second cutoff valve 17 can be controlled.

In the pulse shot type flow controller 1 of FIG. 1, when the pressure condition of the process gas source on the upstream side of the pulse shot type flow controller 1 and the pressure condition of the vacuum vessel on the downstream side of the pulse shot type flow controller 1 are stable, by changing all of the opening operation durations ti+1, ti+2, ti+3, . . . , and ti+r of the second cutoff valve 17 of the pulse shots starting from the (i+1)th pulse shot to the same value, the after-exhaust pressures Pi+1$_{redu}$, Pi+2$_{redu}$, Pi+3$_{redu}$, . . . , and Pi+r$_{redu}$ (not shown) of the process gas in the gas filling capacity 13 by the pulse shots starting from the (i+1)th pulse shot change to the same value, and the volumes Qi+1(T=20), Qi+2(T=20), Qi+3(T=20), . . . , and Qi+r(T=20) of the process gas exhausted from the second cutoff valve 17 by the pulse shots starting from the (i+1)th pulse shot also change to the same value. Thus, the volume flow Q of the process gas exhausted from the second cutoff valve 17 can be controlled relatively easily.

Figure 5:
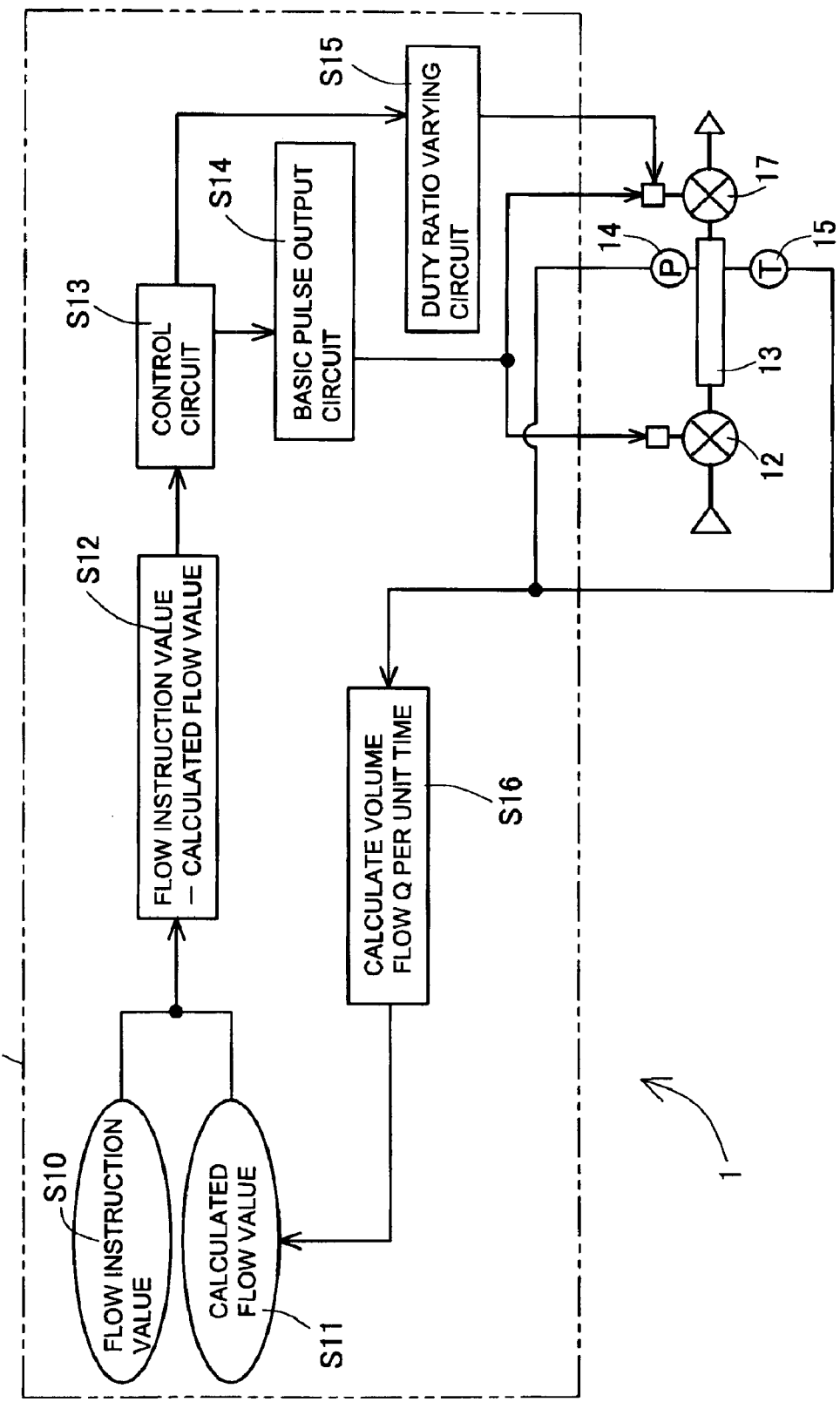
FIG. 5 is a diagram serving as a flowchart and a block diagram of the pulse shot type flow controller of the invention.

An example of a pulse shot type flow controlling method executed by the pulse shot type flow controller 1 of FIG. 1 will now be described with reference to FIG. 5. The pulse shot type flow controlling method shown in FIG. 5 is feedback control executed by the controller 19 in the pulse shot type flow controller 1. Specifically, first, in S10, the volume flow Q of the process gas exhausted from the second cutoff valve 17 per unit time is input as a "flow instruction value". In S11, the present volume flow Q of the process gas exhausted from the second cutoff valve 17 per unit time is obtained as a "calculated flow value". In S12, a control deviation as the difference between the "flow instruction value" and the "calculated flow value" is calculated.

In S13, to set the control deviation obtained in S12 to "0", on the basis of the equations (1)' to (5)' and equations (6)' and (6)'', either a change in the predetermined cycle of the pulse shot (opening/closing operation of the first cutoff valve 12 and, after that, opening/closing operation of the second cutoff valve 17) or a change in the opening operation duration of the second cutoff valve 17 by the pulse shot (opening/closing operation of the first cutoff valve 12 and, after that, opening/closing operation of the second cutoff valve 17) is determined. The result is transmitted to a control circuit built in the controller 19 in the pulse shot type flow controller 1. In the case where it is determined to change the predetermined cycle of a pulse shot, the routine advances to S14 where the predetermined cycle of the pulse shots is changed via a basic pulse output circuit built in the controller 19 of the pulse shot type flow controller 1. On the other hand, in the case where it is determined to change the opening operation duration of the second cutoff valve 17 of each pulse shot, the routine advances to step S15 where the opening operation duration of the second cutoff valve 17 in each pulse shot is changed via a duty ratio varying circuit built in the controller 19 in the pulse shot type flow controller 1.

After that, in S16, n the basis of the after-filling pressure $P_{fill}$ and the after-exhaust pressure $P_{redu}$ of the process gas in the gas filling capacity 13 measured by the pressure sensor 14 and on the basis of the temperature T of the process gas in the gas filling capacity 13 measured by the temperature sensor 15, the volume flow Q of the process gas exhausted from the second cutoff valve 17 per unit time is calculated by the equations (1)' to (5)', the equations (6)' and (6)'' or the like and the resultant value is used as the "calculated flow value" in S11.

In such a manner, the pulse shot type flow controller 1 can perform feedback control on the volume flow Q of the process gas exhausted from the second cutoff valve 17 per unit time. However, depending on the conditions, for example, as shown in FIG. 6, a dead zone may exist.

Figure 6:
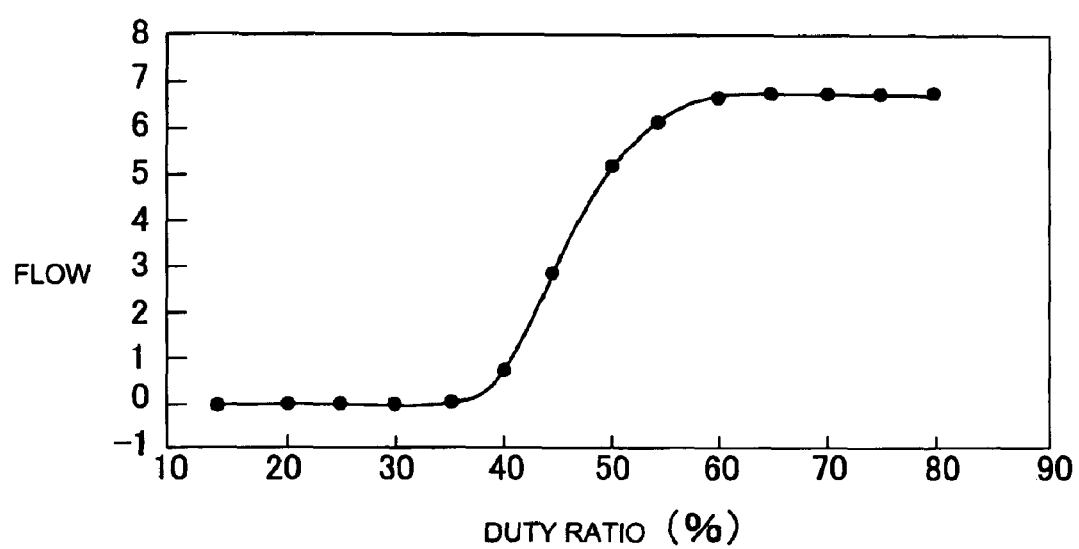
FIG. 6 is a diagram showing an example of the relation between the volume flow of process gas exhausted by the second cutoff valve and the duty ratio of the second cutoff valve under certain conditions in the pulse shot type flow controller of the invention.

The "duty ratio" in FIG. 6 is a proportion (%) of the opening operation duration to a time interval from the opening operation to the opening operation of the next time in the second cutoff valve 17.

As specifically described above, in the pulse shot type flow controller 1 and the pulse shot type flow controlling method executed by the pulse shot type flow controller 1, by repeating the pulse shot (the opening/closing operation of the first cutoff valve 12 and, after that, the opening/closing operation of the second cutoff valve 17), calculating the volume flow Q of the process gas exhausted from the second cutoff valve 17 per unit time by the equations (1)' to (5)' on the basis of the after-filling pressure $P_{fill}$, after-exhaust pressure $P_{redu}$, and the like of the process gas in the gas filling capacity 13 measured by the pressure sensor 14 (S16) and, further, changing the mode of the pulse shot (the opening/closing operation of the first cutoff valve 12 and, after that, the opening/closing operation of the second cutoff valve 17) (S14 and S15), that is, by using a novel type called the pulse shot type, the volume flow Q of the process gas exhausted from the second cutoff valve 17 per unit time is controlled.

Therefore, in the pulse shot type flow controller 1 and the pulse shot type flow controlling method executed by the pulse shot type flow controller 1, as shown in FIG. 1, (1) there is no influence of a turbulent flow of the process gas and a device such as a laminar flow tube for forcefully suppressing turbulent flow of the process gas becomes unnecessary. (2) It becomes unnecessary to interpose a measurement device such as a tubule in a channel of the process gas. (3) The pressure of the process gas is not regulated, a device such as a regulator becomes unnecessary, and the components become simpler. In such a manner, the pulse shot type flow controller 1 and the pulse shot type flow controlling method can be released from the conventional restrictions.

In a semiconductor manufacturing apparatus, corrosive gas is used, gas replacement is performed, and a cutoff valve is often used for switching a gas channel or the like. With respect to this point, the pulse shot type flow controller 1 and the pulse shot type flow controlling method executed by the pulse shot type flow controller 1 are used for a semiconductor manufacturing apparatus as shown in FIG. 1. Therefore, (4) since a measurement device such as a tubule is not used, abnormality such as clogging caused by corrosion does not occur. (5) Since there is no dead volume, gas replacement can be executed with reliability. (6) By using the first and second cutoff valves 12 and 17 for switching a gas channel, the number of cutoff valves used for switching a gas channel or the like can be reduced.

Figure 8:
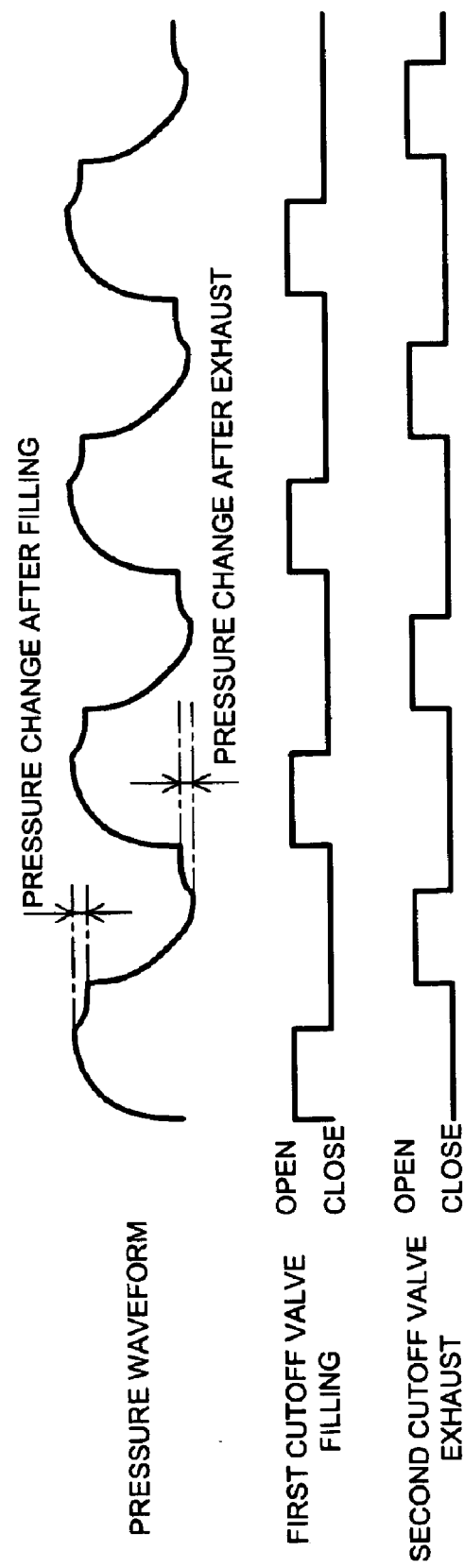
FIG. 8 is a diagram showing an example of the relation between opening/closing operations of the first and second cutoff valves in the case of making pulse shots at high frequency and pressure waveform of process gas in the gas filling capacity in the pulse shot type flow controller of the invention.

It was found out through experiments conducted by the applicant of the present invention that when pulse shots are performed at high frequency such that the filling/exhausting cycle is less than one second, the pressure waveform of the process gas in the gas filling capacity 13 as shown in FIG. 8 is obtained. Specifically, when such high-frequency pulse shots are made, a temperature rise of the process gas in the gas filling capacity 13 occurs due to adiabatic compression at the time of filling, and a temperature drop of the process gas in the gas filling capacity 13 occurs due to adiabatic expansion at the time of exhaust. Consequently, the pressure waveform of the process gas in the gas filling capacity 13 becomes as shown in FIG. 8.

To be specific, after a temperature change occurs at each of the filling time and the exhaust time, heat exchange occurs in the gas filling capacity 13. When the filling/exhaust cycle becomes shorter, the heat exchange continues also in a sealed state after the filling/exhaust, and both temperature and pressure continue changing. Therefore, it is useless to measure the pressure during the period. It is necessary to measure the pressure after completion of the heat exchange or after the temperature decreases to a temperature at which there is no problem with precision, and use the measured temperature for the flow calculation.

In the case of making pulse shots at high frequency, however, high-precision flow measurement cannot be performed. In order to solve the problem, there is a method of measuring pressure at predetermined timings in consideration of a temperature change amount, multiplying the pressure with a correction factor, and using the result value. However, the temperature change caused by adiabatic compression and adiabatic expansion is determined by a ratio of specific heat peculiar to the kind of gas and a ratio between pressures before and after filling/exhaust, so that it is not constant. A correction factor has to be calculated in advance by a flow test under necessary conditions. Consequently, the method is not practical.

Also in the pulse shot type according to the invention, when the flow changes, average temperature of the process gas in the gas filling capacity 13 changes. To be specific, when a constant flow occurs, the process gas of which temperature decreased due to adiabatic expansion at the time of exhaust is heated by the gas filling capacity 13 at the time of sealing, and the adiabatic compression caused by filling occurs again in the gas filling capacity 13, so that a temperature rise higher than that before the adiabatic expansion occurs. The temperature changes until an equilibrium state is obtained among the increased temperature, external air, and peripheral devices. Since the degree of a temperature drop caused by the adiabatic expansion differs according to the flow, an equilibrium state temperature also changes.

Consequently, it is necessary to allow precision deterioration by the amount of the temperature rise or wait for a drop of the increased temperature to a temperature at which no influence is exerted. In this manner, however, pulse shots can be made at low frequency, and the method is not practical.

There is also a method of using a measurement value of the temperature sensor 15. From the viewpoint of an equation of state of gas, if instantaneous pressure and temperature at an arbitrary time point can be measured in a sealed state after filling/exhaust in the gas filling capacity 13, an equation of state can be derived. The number of moles of the process gas in the gas filling capacity 13 at that time point can be specified and the volume flow Q of the process gas exhausted from the second cutoff valve 17 can be calculated.

The equation of state of the process gas in the gas filling capacity after filling is expressed as follows.

$$P_{fill} * V = n_{fill} * R * T_{fill}$$

Consequently, the number of moles of the process gas in the gas filling capacity after filling is expressed as follows.

$$n_{fill} = (P_{fill} * V)/(R * T_{fill})$$

"$n_{fill}$" denotes the number of moles of the process gas in the gas filling capacity at the time of filling, "R" denotes a gas constant, and "$T_{fill}$" indicates the temperature of the process gas in the gas filling capacity after filling.

On the other hand, the equation of state of the process gas in the gas filling capacity after exhaust is expressed as follows.

$$P_{redu} * V = n_{redu} * R * T_{redu}$$

Consequently, the number of moles of the process gas in the gas filling capacity after exhaust is as follows.

$$n_{redu} = (P_{redu} * V)/(R * T_{redu})$$

"$n_{redu}$" denotes the number of moles of the process gas in the gas filling capacity after exhaust, and "$T_{redu}$" denotes the temperature of the process gas in the gas filling capacity exhaust.

The number $n_{ex}$ of moles of the process gas exhausted from the second cutoff valve 17 is expressed as follows.

$$n_{ex} = n_{fill} - n_{redu}$$
$$= (P_{fill} * V)/(R * T_{fill}) - (P_{redu} * V)/(R * T_{redu})$$
$$= V/R(P_{fill}/T_{fill} - P_{redu}/T_{redu})$$

Therefore, the volume $V_{ex}$ of the process gas exhausted from the second cutoff valve 17 is expressed as follows.

$$V_{ex} = n_{ex} * R * 273.15/101.3$$
$$= 2.6962 * R * n_{ex}$$
$$= 2.6962 * V * (P_{fill}/T_{fill} - P_{redu}/T_{redu})$$

Consequently, the volume flow Q of the process gas exhausted from the second cutoff valve 17 is derived as follows.

$$Q = V_{ex} * r * 60 \qquad \text{Equation (7)}$$
$$= 161.17 * r * V * (P_{fill}/T_{fill} - P_{redu}/T_{redu})$$

Therefore, if the instantaneous pressure and temperature at an arbitrary time point can be measured in a sealed state after filling/exhaust in the gas filling capacity 13, the volume flow Q of the process gas exhausted from the second cutoff valve 17 can be calculated by the equation (7).

However, it is extremely difficult to perform high-speed measurement of the temperature of gas having low density because a temperature sensor for measuring the temperature of corrosive gas is generally covered with corrosive-resistant metal, resin, ceramic or the like, so that the quantity of heat is large and high response cannot be obtained. By a very thin thermocouple and a temperature sensor made of semiconductor silicon, high response can be obtained but the temperature of corrosive gas cannot be measured. In the current state, a corrosion temperature sensor capable of measuring a temperature change accompanying high-speed adiabatic compression/expansion in a real time manner does not exist. That is, in the current state, it is impossible to measure a temperature change in the process gas in the gas filling capacity 13 in a real time manner by the temperature sensor 15.

On the other hand, the pressure can be measured with response of 1 second or less. Therefore, the pulse shot type flow controller 1 according to the embodiment and the pulse shot type flow controlling method executed by the pulse shot type controller 1 realizes high-precision flow measurement by measuring a pressure change proportional to a temperature change.

First, in a sealed state after filling, pressure in the heat equilibrium state is estimated from a pressure value and a pressure change rate. For example, a tangent of a pressure change curve is calculated from pressure values measured at predetermined time intervals, and pressure after a time constant which is calculated in advance is computed and used as pressure in the heat equilibrium state after filling.

Similarly, in the sealed state after exhaust, pressure in the heat equilibrium state is estimated from the pressure value and the pressure change rate. For example, a tangent of a pressure change curve is obtained from pressure values measured at predetermined time intervals, and pressure after a time constant which is calculated in advance is computed and used as pressure in the heat equilibrium state after exhaust.

Since a pressure change at the time of sealing is not always be a simple primary response, the pressure in the heat equilibrium state is used and computed while switching a proper time constant in accordance with the gas kind, primary pressure, pressure drop amount due to the exhaust, and the like.

The pressures of filling and exhaust computed as described above (after-filling estimated pressure and after-exhaust estimated pressure) are set as the after-filling pressure $P_{fill}$ and the after-exhaust pressure $P_{redu}$, the average temperature obtained from the temperature sensor 15 is used as an equilibrium temperature, and the volume flow Q of the process gas exhausted from the second cutoff valve 17 is calculated by the equation (7).

A method of calculating the volume flow Q of the process gas exhausted from the second cutoff valve 17 executed by the controller 19 in the pulse shot type flow controller 1 on the basis of the above-described concept will now be described. First, a method of calculating a time constant will be described with reference to FIGS. 9 and 10. Since the pressure change is deviated from a primary response, the pressure change cannot be the as a time constant in accurate meaning. However, it will be called a "time constant" for convenience since it is conceptually close to a time constant.

First, the case of obtaining a time constant at the time of filling the process gas to the gas filling capacity 13 will now be described with reference to FIG. 9. First, a time point of closing of the first cutoff valve 12 is set as t0 (reference point of time). After lapse of the time t1 in which a pressure change in after closing the first cutoff valve can be reliably detected with an allowance of response delay time (about 1 msec) of the first cutoff valve 12 (for example, after lapse of 3 msec, t1=3 msec), pressure measurement of the first time is conducted by the pressure sensor 14. The measurement value at this time is displayed as (t1, p1). Further, after lapse of predetermined time (for example, after lapse of 1 msec, t2=4 msec), pressure measurement of the second time is executed by the pressure sensor 14. The measurement value at this time is indicated as (t2, p2). Further, after lapse of predetermined time (for example, after lapse of 1 msec, t3=5 msec), pressure measurement of the third time is performed by the pressure sensor 14. The measurement value at this time is expressed as (t3, p3).

The time interval of pressure measurement does not have to be the same but has to be a fixed time. In order to suppress influence of noise or the like, pressures at measurement points are measured a plurality of times (for example, eight times every 10 $\mu$sec) and an average value of the measured pressures may be used.

Further, after lapse of sufficient time (for example, after lapse of 1 sec, t4=1005 msec), pressure measurement of the fourth time is performed by the pressure sensor 14. The measurement value at this time is expressed as (t4, p4).

A time constant ΔTs of a pressure change at the time of filling is calculated from the measurement results. As an example, a time constant at the time point t2 is obtained. First, an equation of a tangential line L passing (t2, p2) from (t1, p1), (t2, p2), (t3, p3), and (t4, p4) is obtained by the following equation.

$$\text{Tangential line } L: P=(p3-p1)/(t3-t1)*(t-t2)+p2 \quad \text{Equation (8)}$$

Although it is obtained by the simple method, the equation of the tangential line L may be also obtained by using other methods such as the least square method.

Subsequently, time at which the tangential line L matches p4 is obtained, and t2 is subtracted from the time. The result of the calculation is the time constant ΔTs at the time point t2. The time constant ΔTs is expressed by the following equation.

$$\Delta Ts=(p4-p2)*(t3-t1)/(p3-p1)-t2$$

Figure 9:
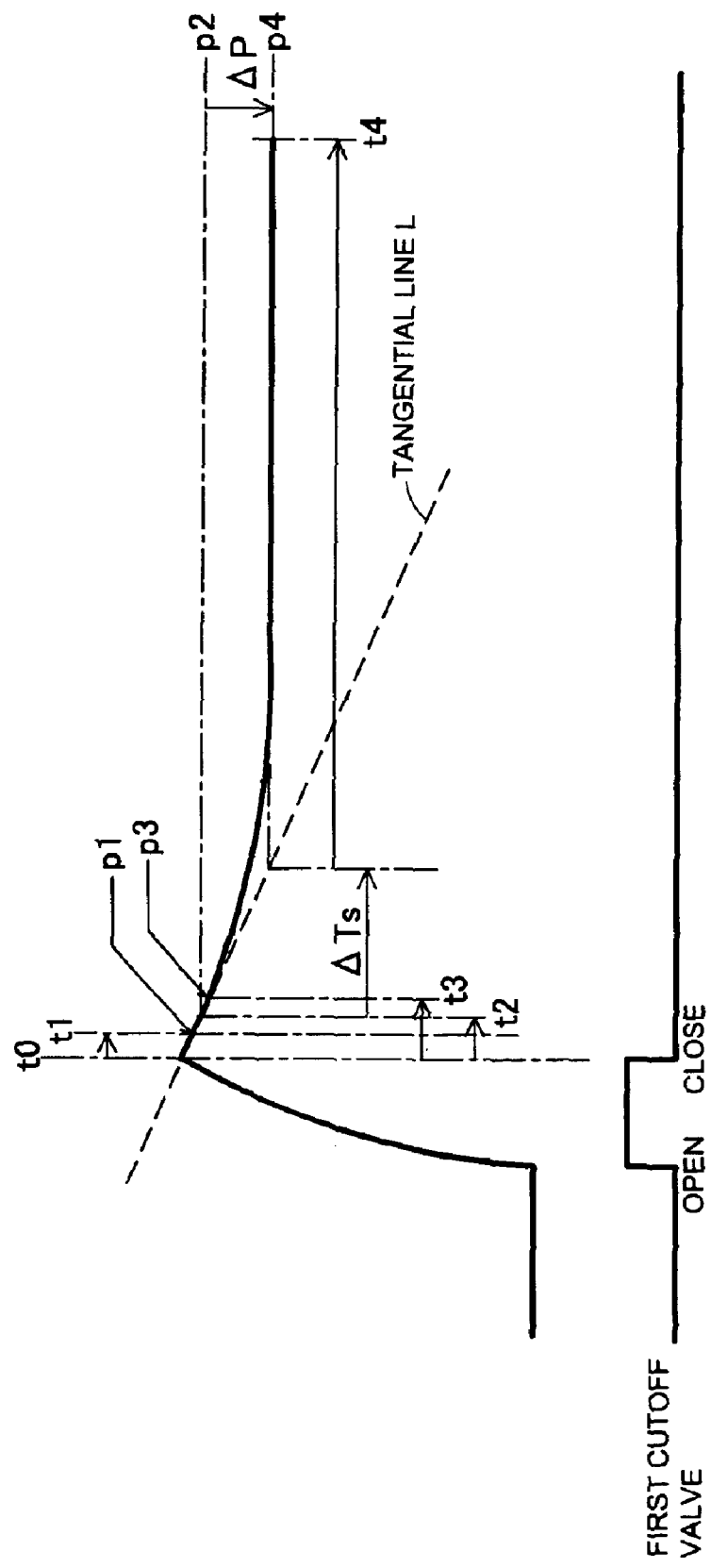
FIG. 9 is a diagram for explaining a method of calculating a time constant at the time of filling in the case of performing pulse shots at high frequency in the pulse shot type flow controller of the invention.

ΔP(=p4−p2) shown in FIG. 9 denotes a pressure drop amount from p2 to the pressure p4 at the equilibrium temperature and reflects the temperature drop amount.

The case of obtaining a time constant at the time of exhausting the process gas in the gas filling capacity 13 will now be described with reference to FIG. 10. First, a time point of closing of the second cutoff valve 17 is set as t0' (reference point of time). After lapse of the time t1' in which a pressure change after closing the second cutoff valve 17 can be reliably detected with an allowance of response delay time (about 1 msec) of the second cutoff valve 17 (for example, after lapse of 3 msec, t1'=3 msec), pressure measurement of the first time is conducted by the pressure sensor 14. The measurement value at this time is displayed as (t1', p1'). Further, after lapse of predetermined time (for example, after lapse of 1 msec, t2'=4 msec), pressure measurement of the second time is executed by the pressure sensor 14. The measurement value at this time is indicated as (t2', p2'). After lapse of predetermined time (for example, after lapse of 1 msec, t3'=5 msec), pressure measurement of the third time is performed by the pressure sensor 14. The measurement value at this time is expressed as (t3', p3').

The time interval of pressure measurement does not have to be the same time but has to be fixed time. In order to suppress influence of noise or the like, pressures at measurement points are measured a plurality of times (for example, eight times every 10 $\mu$sec) and an average value of the measured pressures may be used.

Further, after lapse of sufficient time (for example, after lapse of 1 sec, t4'=1005 msec), pressure measurement of the fourth time is performed by the pressure sensor 14. The measurement value at this time is expressed as (t4', p4').

A time constant ΔTe of a pressure change at the time of exhaust is calculated from the measurement results. As an example, a time constant at the time point t2' is obtained. First, an equation of a tangential line L' passing (t2', p2') from (t1', p1'), (t2', p2'), (t3', p3'), and (t4', p4') is obtained by the following equation.

$$\text{Tangential line } L': P=(p3'-p1')/(t3'-t1')*(t-t2')+p2' \quad \text{Equation (9)}$$

Although it is obtained by the simple method, the equation of the tangential line L' may be also obtained by using other methods such as the least square method.

Subsequently, time at which the tangential line L' coincides with p4' is obtained, and t2' is subtracted from the obtained time. The result of the calculation is the time constant ΔTs at the time point t2'. The time constant ΔTs is expressed by the following equation.

$$\Delta Ts=(p4'-p2')*(t3'-t1')/(p3'-p1')-t2'$$

Figure 10:
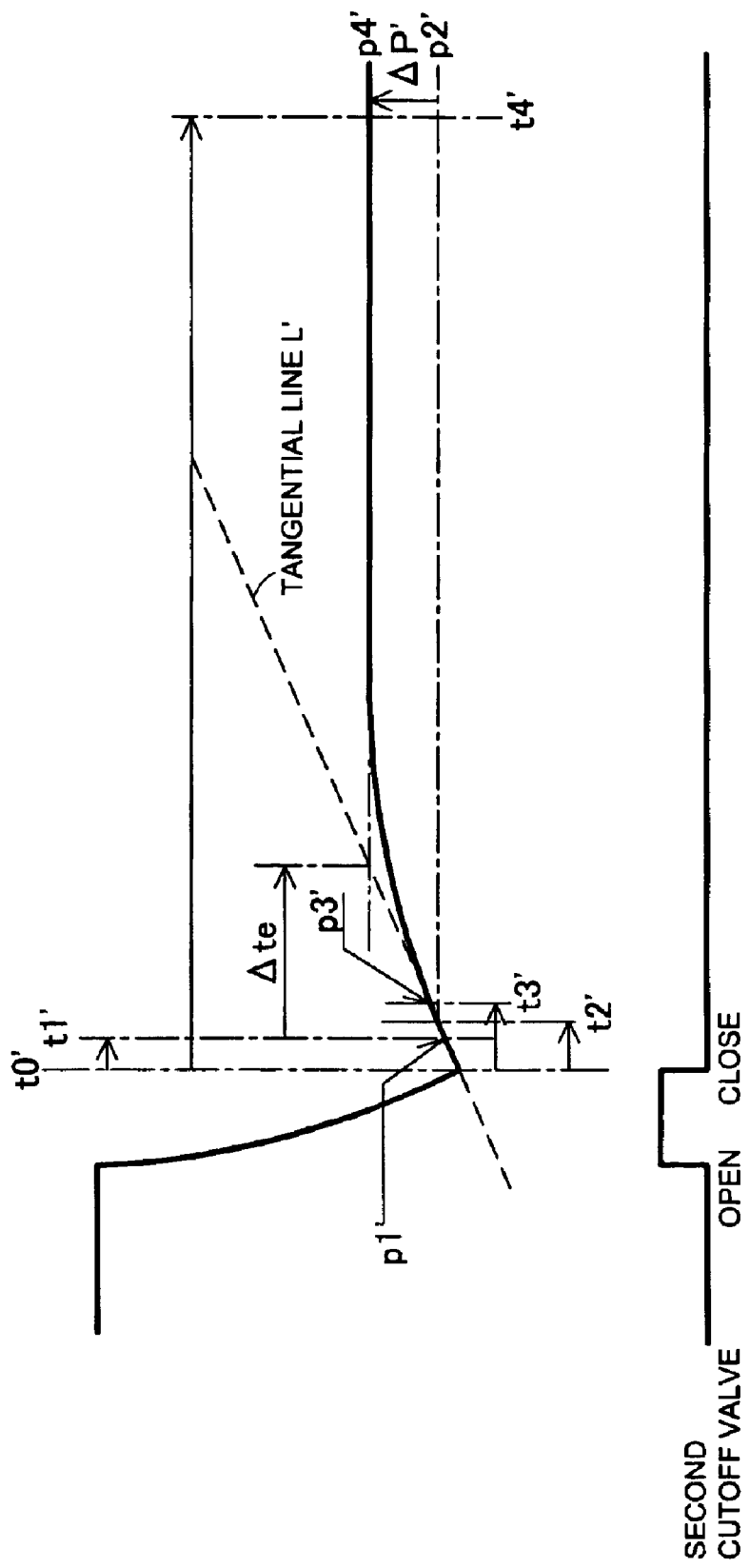
FIG. 10 is a diagram for explaining a method of calculating a time constant at the time of exhaust in the case of performing pulse shots at high frequency in the pulse shot type flow controller of the invention.
Figure 11:
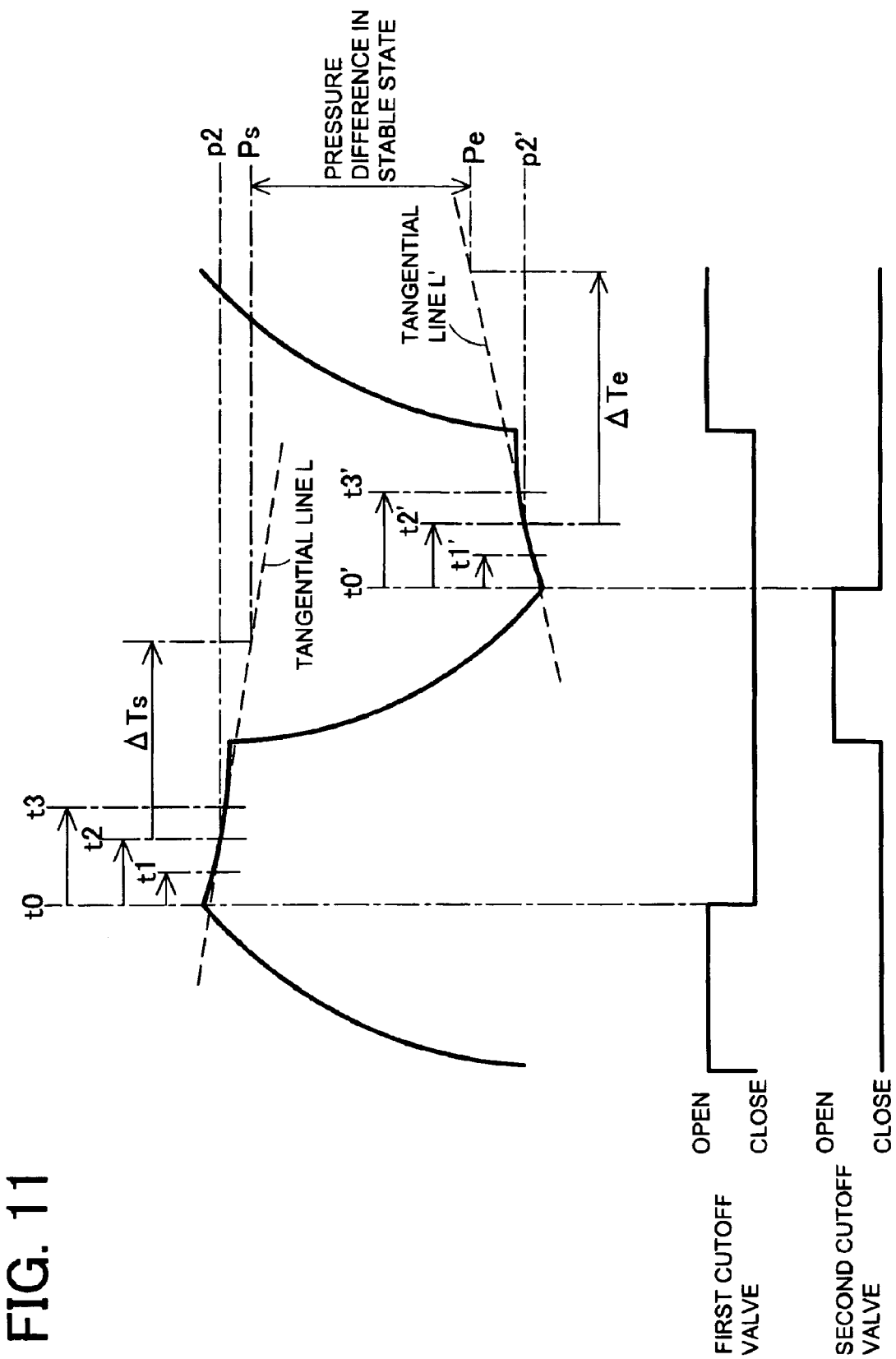
FIG. 11 is a diagram for explaining a method of calculating an after-filling estimated pressure and an after-exhaust estimated pressure in the case of making pulse shots at high frequency in the pulse shot type flow controller of the invention.

ΔP'(=p4'−p2') shown in FIG. 10 denotes a pressure drop amount from p2' to the pressure p4' at the equilibrium temperature and reflects the temperature drop amount.

By using the time constants ΔP and ΔP' calculated as described above, the volume flow Q of the process gas exhausted from the second cutoff valve 17 is calculated. The calculation method will be described with reference to FIG. 10. The volume flow Q of the process gas is also calculated by the controller 19.

The volume flow Q of the process gas is calculated by executing the following arithmetic operation every cycle of the pulse shot. First, the first cutoff valve 12 is opened to fill the gas filling capacity 13 with the process gas for specified time. After lapse of the specified time t1 since the time point at which the first cutoff valve 12 was closed, the pressure p1 is measured by the pressure sensor 14. Similarly, after lapse of specified time since the time point at which the first cutoff valve 12 was closed, pressure p2 is measured by the pressure sensor 14. After lapse of specified time t3 since the time point at which the first cutoff valve 12 was closed, pressure p3 is measured by the pressure sensor 14. From a combination of the times and pressures at the three points, an equation of the tangential line L passing (t2, p2) is obtained by the equation (8).

The pressure Ps after the known time constant $\Delta$Ts is computed by the following equation and set as stable pressure Ps after filling (after-filling estimated pressure).

$$Ps=(p3-p1)/(t3-t1)*\Delta Ts+p2$$

After lapse of adjusted predetermined time, the second cutoff valve 17 is opened to exhaust the process gas and then is closed. After lapse of specified time t1' from the time point at which the second cutoff valve 17 was closed, pressure p1' is measured by the pressure sensor 14. Similarly, after lapse of specified time t2' since the time point at which the second cutoff valve 17 was closed, pressure p2' is measured by the pressure sensor 14. After lapse of specified time t3' since the time point at which the second cutoff valve 17 was closed, pressure p3' is measured by the pressure sensor 14. From a combination of the times and pressures at the three points, an equation of the tangential line L' passing (t2', p2') is obtained by the equation (9).

The pressure Pe after the known time constant $\Delta$Te is obtained by the following equation and set as stable pressure Pe after exhaust (after-exhaust estimated pressure).

$$Pe=(p3'-p1')/(t3'-t1')*\Delta Te+p2'$$

The volume flow $\Delta$Q of exhaust from the second cutoff valve 17 by the pulse shot of one cycle is computed by the following equation using Ps and Pe which are calculated as described above.

$$\Delta Q=V(Ps-Pe)/T$$

"T" denotes average temperature (absolute temperature) in the gas filling capacity 13.

Although the pressures Ps and Pe in a stable state have been estimated in this case, it is also possible to estimate temperatures T2 and T2' at time points t2 and t2' and calculate the volume flow $\Delta$Q of exhaust from the second cutoff valve 17 by the pulse shot of one cycle from the following equation.

Since T2=T*p2/Ps and T2'=T*p2'/Pe, the volume flow $\Delta$Q can be obtained as follows.

$$\Delta Q=V(p2/T2-p2'/T2')$$

On the basis of the volume flow $\Delta$Q calculated as described above, flow control is executed by the controller 19. Concretely, on the basis of the deviation of $\Delta$Q from the volume flow $\Delta$Qo of exhaust from the second cutoff valve 17 by the pulse shot of one cycle computed from a flow instruction value, the width of a pulse applied to the second cutoff valve 17 in the pulse shot of the next cycle is properly increased/decreased. Specifically, when $\Delta$Q is smaller than $\Delta$Qo, the pulse width is increased. When $\Delta$Q is larger than $\Delta$Qo, the pulse width is decreased. As a method of increasing/decreasing the pulse width, proportional control for giving increase/decrease in proportion to the deviation, integration control of adding the deviation at a constant rate, differential control for making a large correction to a sharp change in the deviation, and the like may be properly combined.

Figure 12:
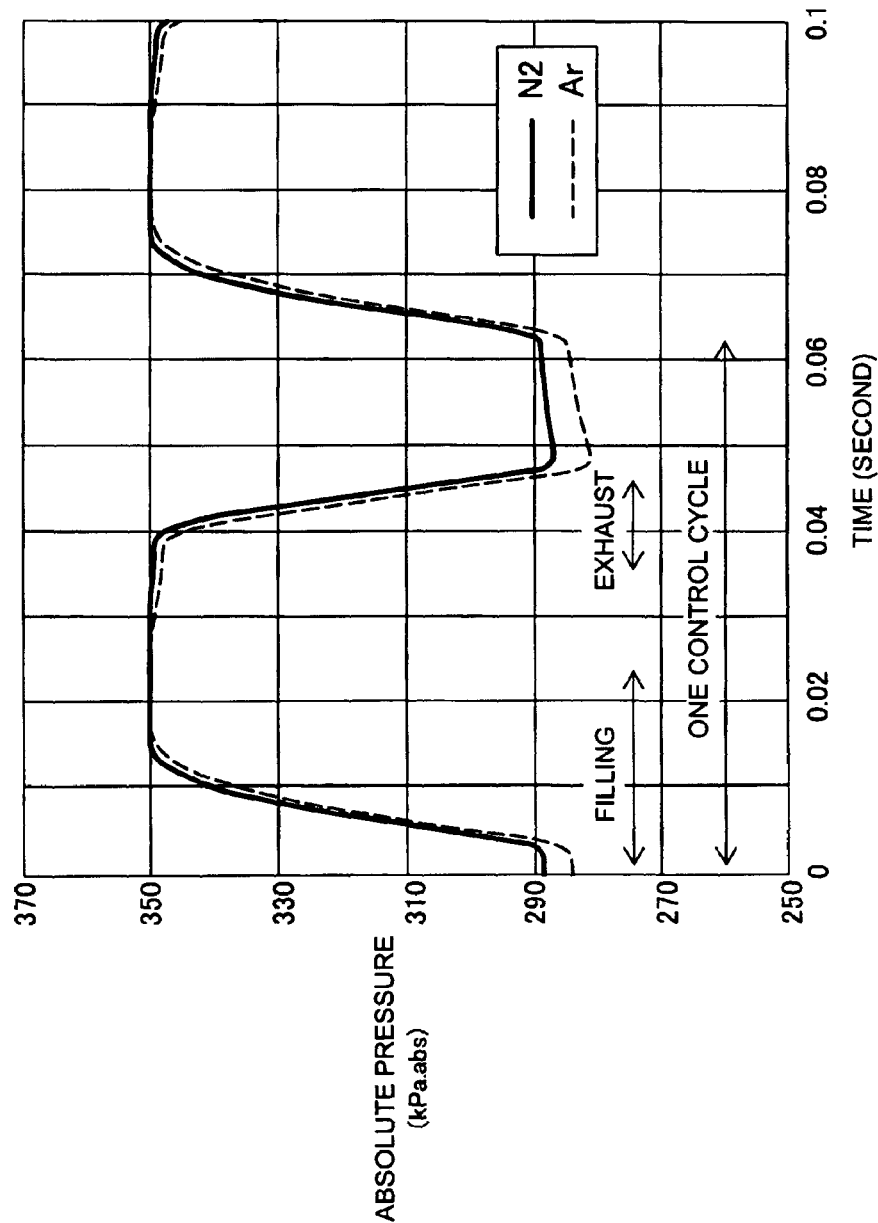
FIG. 12 is a diagram showing waveform of pressure in the gas filling capacity at the time of passing $N_2$ gas and Ar gas by performing pulse shots at high frequency in the pulse shot type flow controller of the invention.

FIGS. 13 to 15 show results of calculation of the volume flow Q calculated by the controller 19 when two kinds of gases ($N_2$ and Ar) are passed at a specified flow rate (800 sccm) to the pulse shot type flow controller 1. FIG. 13 shows various data at the time of filling. FIG. 14 shows various data at the time of exhaust. FIG. 15 shows a calculation result. FIG. 12 shows the pressure waveform at the time of calculation.

As shown in FIG. 12, the rate of a pressure change differs according to the gas kind for the reason that the ratio of specific heat varies according to the gas kind. With respect to the $N_2$ gas and the Ar gas used this time, it is understood that the temperature change of the Ar gas having a higher ratio of specific heat is larger, so that the pressure change of the Ar gas is also larger.

First, various data at the time of calculating the volume flow Q of the $N_2$ gas is examined. At the time of filling the $N_2$ gas, as shown in FIG. 13, the gas filling capacity 13 was filled with the $N_2$ gas and the pressure p1 at time t0 when the first cutoff valve 12 was closed was 350.39 kPa. The pressure p1 at time t1 after lapse of 3 msec since t0 was 350.22 kPa. Further, the pressure p2 at time t2 after lapse of 1 msec was 350.13 kPa. Further, the pressure p3 at time t3 after lapse of 1 msec was 349.97 kPa. As described above, it is understood that the pressure of the $N_2$ gas in the gas filling capacity 13 gradually decreases after the second cutoff valve 17 is closed. On the basis of the measured pressure, the time constant $\Delta$Ts at the time point t2 was calculated as 16 msec. The pressure Ps after the time constant $\Delta$Ts was calculated as 348.1 kPa.

On the other hand, at the time of exhaust of the $N_2$ gas, as shown in FIG. 14, the pressure p1' at time t0' at which the second cutoff valve 17 was closed after the second cutoff valve 17 was opened to exhaust the $N_2$ gas from the gas filling capacity 13 was 288.08 kPa. The pressure p1' at time t1' after lapse of 4 msec since t0' was 287.17 kPa. Further, the pressure p2' at time t2' after lapse of 1 msec was 287.39 kPa. Further, the pressure p3' at time t3' after lapse of 1 msec was 287.55 kPa. As described above, it is understood that the pressure of the $N_2$ gas in the gas filling capacity 13 gradually increases after the second cutoff valve 17 is closed. On the basis of the measured pressure, the time constant $\Delta$Te at the time point t2' was calculated as 50 msec. The pressure Pe after the time constant $\Delta$Te was calculated as 296.8 kPa.

Since the average temperature T of the $N_2$ gas is 300K, the volume V of the gas filling capacity 13 is 1.75 cc, and the pulse frequency r is 16.67 Hz, as shown in FIG. 15, the volume flow Q of exhaust from the second cutoff valve 17 was calculated as 807.4 sccm. An error of the calculation result is 0.92% which is very small. That is, it can be the that the volume flow Q of exhaust from the second cutoff valve 17 is calculated with high precision.

Next, various data used at the time of calculating the volume flow Q of the Ar gas will be examined. As shown in FIG. 13, the pressure p1 at time t0 at which the gas filling capacity 13 was filled with the Ar gas and the first cutoff valve 12 was closed was 350.00 kPa. The pressure p1 at time t1 after lapse of 3 msec since t0 was 349.56 kPa. Further, the pressure p2 at time t2 after lapse of 1 msec was 349.41 kPa. Further, the pressure p3 at time t3 after lapse of 1 msec was 349.12 kPa. As described above, it is understood that the pressure of the Ar gas in the gas filling capacity 13 gradually decreases after the second cutoff valve 17 was closed. On the basis of the measured pressure, the time constant $\Delta$Ts at the time point t2 was calculated as 13 msec. The pressure Ps after the time constant $\Delta$Ts was calculated as 346.6 kPa.

On the other hand, at the time of exhaust of the Ar gas, as shown in FIG. 14, the pressure p1' at time t0' at which the second cutoff valve 17 was closed after the second cutoff valve 17 was opened to exhaust the Ar gas from the gas filling capacity 13 was 281.98 kPa. The pressure p1' at time t1' after lapse of 4 msec since t0' was 282.01 kPa. Further, the pressure p2' at time t2' after lapse of 1 msec was 282.32 kPa. Further, the pressure p3' at time t3' after lapse of 1 msec was 282.66 kPa. As described above, it is understood that the pressure of the Ar gas in the gas filling capacity 13 gradually increases after the second cutoff valve 17 is closed. On the basis of the measured pressure, the time constant ΔTe at the time point t2' was calculated as 42 msec. The pressure Pe after the time constant ΔTe was calculated as 296.1 kPa.

Since the average temperature T of the Ar gas is 300K, the volume V of the gas filling capacity 13 is 1.75 cc, and the pulse frequency r is 16.67 Hz, as shown in FIG. 15, the volume flow Q of exhaust from the second cutoff valve 17 was calculated as 794.0 sccm. An error of the calculation result is as small as 0.75%. That is, it can be the that the volume flow Q of exhaust from the second cutoff valve 17 is calculated with high precision.

The volume flow Q of exhaust from the second cutoff valve 17 of even gases with different ratios of specific heat can be calculated with high precision.

FIG. 16 shows a result of calculating the volume flow Q of exhaust from the second cutoff valve 17 without considering a temperature change accompanying adiabatic compression/expansion, that is, a result of calculation of the volume flow Q by using the equations (1)' to (5)'. In this case, with respect to the $N_2$ gas, the after-filling pressure $P_{fill}$ was measured as 349.52 kPa, and the after-exhaust pressure $P_{redu}$ was measured as 288.52 kPa, so that the pressure difference is 61.00 kPa, and the volume flow Q of exhaust from the second cutoff valve 17 was calculated as 959 sccm. An error of the calculation result is 12%.

With respect to the Ar gas, the after-filling pressure $P_{fill}$ was measured as 348.34 kPa and the after-exhaust pressure $P_{redu}$ was measured as 284.23 kPa, so that the pressure difference was 64.11 kPa, and the volume flow Q of exhaust from the second cutoff valve 17 was calculated as 1008 sccm. An error of the calculation result is 12.6%.

As described above, in the case of making pulse shots at high frequency, without considering a temperature change accompanying adiabatic compression/expansion, the volume flow Q of exhaust from the second cutoff valve 17 cannot be calculated with high precision. A calculation error becomes large for a gas having a high ratio of specific heat.

As described in detail, in the case of making pulse shots at high frequency in the pulse shot type flow controller 1, by considering a temperature change accompanying adiabatic compression/expansion, an error of the volume flow Q of exhaust from the second cutoff valve 17 can be reduced by 10% or more. That is, even in the case of making pulse shots at high frequency, the flow control can be performed with very high precision by suppressing influences of a temperature change accompanying adiabatic compression/ expansion.

By realizing pulse shots of high frequency, the following effects are obtained. A change interval of pulses can be further shortened, and a pressure change and a flow change according to the pulse can be further reduced. The same flow rate as that in the case of pulse shots of low frequency can be assured with a smaller gas filling capacity. Further, in the case of the same gas filling capacity, a higher flow can be assured. A flow control of higher precision can be performed on various gases of different degrees of a temperature change (the ratio of specific heat) caused by an adiabatic change.

The present invention is not limited to the foregoing embodiment but can be variously changed without departing from the gist.

For example, in the pulse shot type flow controller 1 and the pulse shot type flow controlling method executed by the pulse shot type flow controller 1, at the time of calculating the volume flow Q of process gas exhausted from the second cutoff valve 17 per unit time (S16), 20° C. conversion is performed by the equations (6)', (6)", or the like on the basis of the temperature T of the process gas in the gas filling capacity 13 measured by the temperature sensor 15. If temperature expansion of the process gas can be ignored, 20° C. conversion may be omitted.

In the pulse shot type flow controller 1 and the pulse shot type flow controlling method executed by the pulse shot type flow controller 1, the opening operation duration of the second cutoff valve 17 in each pulse shot is changed via a duty ratio varying circuit built in the controller 19 of the pulse shot type flow controller 1 in S15. Also in the case where the opening operation duration of the first cutoff valve 12 by each pulse shot is changed, the after-filling pressure $P_{fill}$ and the after-exhaust pressure $P_{redu}$ of the process gas of the gas filling capacity 13 of each pulse shot change, so that the volume flow Q of the process gas exhausted from the second cutoff valve 17 per unit time can be controlled.

Alternately, the opening operation time of the first cutoff valve 12 may be changed not for controlling the volume flow of the process gas but for regulation of pressure supplied to the gas filling capacity 13. In the pulse shot type flow controller 1 and the pulse shot type flow controlling method executed by the pulse shot type flow controller 1, when the first cutoff valve 12 is opened to fill the gas filling capacity 13 with the process gas, a filling pressure state of the gas filling capacity 13 can be monitored by the pressure sensor 14. Consequently, at the time point when the pressure reaches predetermined regulated pressure, the first cutoff valve 12 can be closed. Therefore, even if a gas of which pressure exceeds a withstand pressure of the pressure sensor 14 is supplied from a process gas source, the first cutoff valve 12 can be closed so that the pressure cannot exceed the withstand pressure of the pressure sensor 14. In practice, the first cutoff valve 12 is closed with an allowance of a certain degree on the basis of a pressure increase curve and the response at the time of closing of the first cutoff valve 12. Since the action is the same as the action of the regulator 11 for regulating pressure, the regulator 11 can be made unnecessary.

Therefore, the upper limit of the pressure on the primary side (upstream side of the gas filling capacity 13) is substantially determined by the withstanding pressure of the first cutoff valve 12, and a pressure sensor of which withstand pressure is low can be used. The pressure sensor of low withstand pressure has relatively higher resolution as compared with a pressure sensor of high withstand pressure, so that the flow can be measured with high precision. Since the regulator 11 becomes unnecessary, in the case where supply pressure of the process gas is low, there is no pressure loss which occurs in the regulator 11, and the flow can be measured with higher precision.

In the pulse shot type flow controller 1 and the pulse shot type flow controlling method executed by the pulse shot type flow controller 1, in S13, either changing of a predetermined cycle of each pulse shot (opening/closing operation of the first cutoff valve 12 and, after that, opening/closing operation of the second cutoff valve 17) or changing of opening operation duration of the second cutoff valve 17 in each pulse shot (opening/closing operation of the first cutoff valve 12 and, after that, opening/closing operation of the second cutoff valve 17) is determined. Alternately, by making a decision to simultaneously perform both of the changes, the control deviation obtained in S12 can be set to "0".

Figure 7:
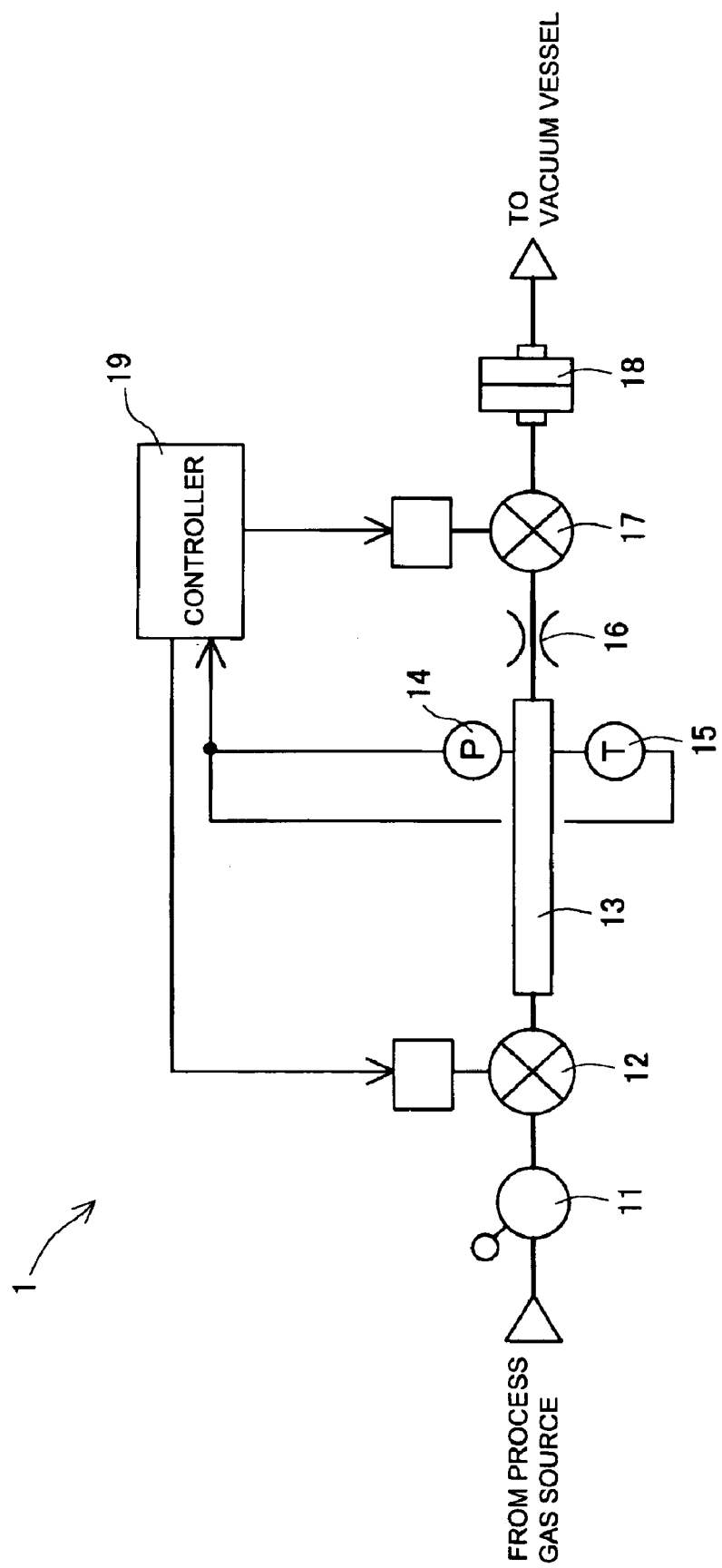
FIG. 7 is a diagram showing a general outline of the pulse shot type flow controller of the invention.

In the pulse shot type flow controller 1 and the pulse shot type flow controlling method executed by the pulse shot type flow controller 1, as shown in FIG. 7, by providing a nozzle 16 on the upstream side of the second cutoff valve 17, (the pressure waveform of) the process gas in the gas filling capacity 13 in each pulse shot can be further stabilized. By providing a filter 18 on the downstream side of the second cutoff valve 17, (the pressure waveform) of the process gas exhausted from the second cutoff valve 17 can be further stabilized.

It is also possible to automatically calculate the time constants ΔTs and ΔTe which become necessary in the case of making pulse shots at high frequency by performing a learning operation described below. First, an unknown necessary gas is supplied, the first cutoff valve 12 is opened, and the second cutoff valve 17 is closed to obtain a filling state. Next, both the first and second cutoff valves 12 and 17 are closed to obtain a sealed state of the gas filling capacity 13 and the state is left sufficiently until a heat equilibrium state is obtained. The second cutoff valve 17 is opened only by short time to cause a pressure drop corresponding to a control flow, after that, the second cutoff valve 17 is closed again, a pressure value and a pressure change rate are measured, and a tangential line of a pressure change curve is derived. The state is sufficiently left until a temperature equilibrium state is obtained and the pressure in the equilibrium state (asymptote) is measured again. From the tangential line and the asymptote, a time constant at the time of control flow is obtained. As necessary, it is also possible to repeat the processes a plurality of times, calculate an average value, and use the average value as a time constant. After that, the control flow is generally measured at some points at the time of both filling and exhaust. On the basis of the data obtained by the measurement, a time constant in a necessary control flow is automatically calculated by complementation.

In such a manner, a necessary time constant of an arbitrary unknown gas can be obtained even if physical properties of the gas are unknown, so that high-precision flow control can be performed.

When gas kinds are different from each other because of the physical properties (viscosity, ratio of specific heat, and the like), flowabilities differ from each other by ten times or more with respect to the same cutoff valve (orifice). When the first and second cutoff valves 12 and 17 are designed for a gas having low flowability, the precision of flow control for a gas having high flowability deteriorates to 1/10. For example, when the second cutoff valve 17 (orifice) is designed so as to make a gas having low flowability ($C_3F_4$) flow at 1 SLM with opening time 25 msec of the second cutoff valve 17 (including waste time of 5 msec and a proportional band is 20 msec), a gas having high flowability (He) flows at the flow rate of 1 SLM with opening time of 7 msec of the second cutoff valve 17. There is only about 2 msec as a proportional band, control resolution deteriorates by ten times and, particularly, controllability at the time of low flow rate deteriorates. The valve open time of 23 msec which is not used as a result is wasted.

On the other hand, when proper opening time of the second cutoff valve 17 is set in accordance with viscosity, the ratio of specific heat, and the like peculiar to a gas, it is necessary to change the setting of the opening time of the second cutoff valve 17 for each gas kind used, and it is inconvenient.

As the second cutoff valve 17, a proportional valve at which an opening (flow characteristic) proportional to a current value is obtained may be used. To be specific, the second cutoff valve 17 is not simply opened/closed but can be opened/closed at an arbitrary opening (flow characteristic of an orifice). It is sufficient to obtain and record a proper opening (current) by switching the opening (current) of the second cutoff valve 17 so that opening time of the second cutoff valve 17 necessary to cause a pressure drop corresponding to a necessary maximum flow becomes almost the maximum value (maximum value including a control allowance and safety) of the opening time of the second cutoff valve 17. For example, in the case where control time of 30 msec is allocated for the second cutoff valve 17, the opening (current) of the second cutoff valve 17 is obtained so that a pressure drop corresponding to the maximum flow occurs with the opening time of 25 msec of the second cutoff valve 17.

In such a manner, proper opening is set for the second cutoff valve 17 by learning to supply an arbitrary gas, so that proper opening time of the second cutoff valve 17 according to the flow is assured. At the maximum flow, most of the allocated control time is opening time. Also at a small flow, opening time in which necessary resolution can be assured is set. Therefore, for different gas kinds or an unknown gas kind, proper opening time of the second cutoff valve 17 can be assured, and controllability does not deteriorate. Thus, for any gas kind, the flow control can be performed with high precision.

INDUSTRIAL APPLICABILITY

As described above, in the pulse shot type flow controller and the pulse shot type flow controlling method of the invention, a novel type of a pulse shot type is used. That is, a pulse shot of performing the opening/closing operation of the first cutoff valve and, after that, performing the opening/closing operation of the second cutoff valve is repeated, a volume flow of a gas exhausted from the second cutoff valve is calculated on the basis of an after-filling pressure and an after-exhaust pressure of gas filling capacity measured by the pressure sensor, and the mode of the pulse shot is changed, thereby controlling the volume flow of the gas exhausted from the second cutoff valve. (1) There is no influence of a turbulent flow of the process gas and a device such as a laminar flow tube for forcefully suppressing turbulent flow of the gas becomes unnecessary. (2) It becomes unnecessary to interpose a measurement device such as a tubule in a channel of the gas. (3) The pressure of the gas is not regulated, a device such as a regulator becomes unnecessary, and the components become simpler. In such a manner, the pulse shot type flow controller and the pulse shot type flow controlling method can be released from the conventional restrictions.

In a semiconductor manufacturing apparatus, corrosive gas is used, gas replacement is performed, and a cutoff valve is often used for switching a gas channel or the like. Consequently, by using the pulse shot type flow controller and the pulse shot type flow controlling method of the invention for a semiconductor manufacturing apparatus, (4) since a measurement device such as a tubule is not used, abnormality such as clogging caused by corrosion does not occur. (5) Since there is no dead volume, gas replacement can be executed with reliability. (6) By using the first and second cutoff valves for switching a gas channel, the number of cutoff valves used for switching a gas channel or the like can be reduced.

In the case of making pulse shots at high frequency, by considering a temperature change accompanying adiabatic compression/expansion, a flow control can be performed with very high precision.

By realizing pulse shots of high frequency, the following effects are obtained. A change interval of pulses can be further shortened, and a pressure change and a flow change according to the pulse can be further reduced. The same flow rate as that in the case of pulse shots of low frequency can be assured with a smaller gas filling capacity. Further, in the case of the same gas filling capacity, a higher flow can be assured. A flow control of higher precision can be performed on various gases of different degrees of a temperature change (the ratio of specific heat) caused by an adiabatic change.

What is claimed is:

1. A pulse shot type flow controller comprising:
    a first cutoff valve connected to a gas source;
    a second cutoff valve connected to the first cutoff valve;
    a gas filling capacity between the first and second cutoff valves; and
    a pressure sensor for measuring pressure in the gas filling capacity,
    wherein a pulse shot of performing opening/closing operation of the first cutoff valve and, after that, performing opening/closing operation of the second cutoff valve is repeated, and volume flow of a gas exhausted from the second cutoff valve is calculated on the basis of an after-filling pressure and an after-exhaust pressure of the gas filling capacity measured by the pressure sensor,
    while controlling the volume flow of the gas exhausted from the second cutoff valve by changing the mode of the pulse shot.

2. The pulse shot type flow controller according to claim 1, wherein the volume flow of the gas exhausted from the second cutoff value is calculated by calculating volume of the gas exhausted from the second cutoff valve every the pulse shot and integrating the volumes.

3. The pulse shot type flow controller according to claim 1, wherein the volume flow of the gas exhausted from the second cutoff valve is calculated on the basis of a predetermined cycle of repeatedly making the pulse shot.

4. The pulse shot type flow controller according to claim 1, wherein the mode of the pulse shot is changed by changing the predetermined cycle of repeatedly making the pulse shot.

5. The pulse shot type flow controller according to claim 1, wherein the mode of the pulse shot is changed by changing opening operation duration of the first cutoff valve or the second cutoff valve.

6. The pulse shot type flow controller according to claim 1, further comprising a temperature sensor for measuring temperature of the gas filling capacity,
    wherein the volume flow of the gas exhausted from the second cutoff valve is calculated also on the basis of the temperature of the gas filling volume measured by the temperature sensor.

7. The pulse shot type flow controller according to claim 1, wherein an after-filling estimated pressure in a heat equilibrium state after filling is obtained on the basis of a change rate of pressure accompanying an adiabatic change in a period (at the time of filling) since the opening/closing operation of the first cutoff valve is performed until the opening/closing operation of the second cutoff valve is performed, the after-filling estimated pressure is used as the after-filling pressure,
    an after-exhaust estimated pressure in a heat equilibrium state after exhaust is obtained on the basis of a change rate of pressure accompanying an adiabatic change in a period (at the time of exhaust) since the opening/closing operation of the second cutoff valve is performed until the opening/closing operation of the first cutoff valve is performed, and the after-exhaust estimated pressure is used as the after-exhaust pressure.

8. The pulse shot type flow controller according to claim 1, wherein the first cutoff valve is closed when the pressure of the gas filling capacity measured by the pressure sensor becomes a predetermined value or larger.

9. The pulse shot type flow controller according to claim 1, wherein the controller is used for a semiconductor manufacturing apparatus.

10. A pulse shot type flow controlling method using a flow controller comprising:
    a first cutoff valve connected to a gas source;
    a second cutoff valve connected to the first cutoff valve;
    a gas filling capacity between the first and second cutoff valves; and
    a pressure sensor for measuring pressure in the gas filling capacity,
    wherein a pulse shot of performing opening/closing operation of the first cutoff valve and, after that, performing opening/closing operation of the second cutoff valve is repeated, and volume flow of a gas exhausted from the second cutoff valve is calculated on the basis of an after-filling pressure/an after-exhaust pressure of the gas filling capacity measured by the pressure sensor,
    while controlling the volume flow of the gas exhausted from the second cutoff valve by changing the mode of the pulse shot.

11. The pulse shot type flow controlling method according to claim 10, wherein the volume flow of the gas exhausted from the second cutoff value is calculated by calculating volume of the gas exhausted from the second cutoff valve every the pulse shot and integrating the volumes.

12. The pulse shot type flow controlling method according to claim 10, wherein the volume flow of the gas exhausted from the second cutoff valve is calculated on the basis of a predetermined cycle of repeatedly making the pulse shot.

13. The pulse shot type flow controlling method according to claim 10, wherein the mode of the pulse shot is changed by changing the predetermined cycle of repeatedly making the pulse shot.

14. The pulse shot type flow controlling method according to claim 10, wherein the mode of the pulse shot is changed by changing opening operation duration of the first cutoff valve or the second cutoff valve.

15. The pulse shot type flow controlling method according to claim 10, further using a temperature sensor for measuring temperature of the gas filling capacity,
    wherein the volume flow of the gas exhausted from the second cutoff valve is calculated also on the basis of the temperature of the gas filling volume measured by the temperature sensor.

16. The pulse shot type flow controlling method according to claim 10, wherein an after-filling estimated pressure in a heat equilibrium state after filling is obtained on the basis of a change rate of pressure accompanying an adiabatic change in a period (at the time of filling) since the opening/closing operation of the first cutoff valve is performed until the opening/closing operation of the second cutoff valve is performed, the after-filling estimated pressure is used as the after-filling pressure,
    an after-exhaust estimated pressure in a heat equilibrium state after exhaust is obtained on the basis of a change rate of pressure accompanying an adiabatic change in a period (at the time of exhaust) since the opening/closing operation of the second cutoff valve is performed until the opening/closing operation of the first cutoff valve is performed, and the after-exhaust estimated pressure is used as the after-exhaust pressure.

17. The pulse shot type flow controlling method according to claim 10, wherein the first cutoff valve is closed when the pressure of the gas filling capacity measured by the pressure sensor becomes a predetermined value or larger.

18. The pulse shot type flow controlling method according to claim 10, wherein the method is used for a semiconductor manufacturing apparatus.

* * * * *